United States Patent [19]

Brown et al.

[11] 4,394,070

[45] Jul. 19, 1983

[54] HELICHROMIC COMPOUNDS AND DISPLAYS

[75] Inventors: Harvey A. Brown, Lake Elmo; William A. Huffman, Minneapolis, both of Minn.

[73] Assignee: Minnesota Mining and Manufacturing Company, St. Paul, Minn.

[21] Appl. No.: 274,184

[22] Filed: Jun. 22, 1981

Related U.S. Application Data

[63] Continuation-in-part of Ser. No. 169,275, Jul. 16, 1980.

[51] Int. Cl.³ .......................... G02F 1/13; C09K 3/34
[52] U.S. Cl. .............................. 350/349; 252/299.01; 252/299.1; 252/299.68; 252/299.7; 350/334; 350/337
[58] Field of Search ........... 252/299.1, 299.68, 299.01, 252/299.7; 350/349, 334, 337

[56] References Cited

U.S. PATENT DOCUMENTS

| | | | |
|---|---|---|---|
| Re. 28,806 | 5/1976 | Saeva et al. | 252/299.01 |
| 3,957,348 | 5/1976 | Saeva | 252/299.01 |
| 3,960,751 | 6/1976 | Moriyama et al. | 252/299.1 |
| 3,973,800 | 8/1976 | Tsukamoto et al. | 252/299.68 |
| 3,977,769 | 8/1976 | Tsukamoto et al. | 252/299.68 |
| 4,032,470 | 6/1977 | Bloom et al. | 252/299.1 |
| 4,105,299 | 8/1975 | Huffman et al. | 252/299.1 |
| 4,122,027 | 10/1978 | Cole, Jr. et al. | 252/299.1 |
| 4,137,193 | 1/1979 | Osman et al. | 252/299.1 |
| 4,143,947 | 3/1979 | Aftergut et al. | 252/299.1 |
| 4,145,114 | 3/1979 | Coates et al. | 252/299.1 |
| 4,153,343 | 5/1979 | Bloom et al. | 252/299.1 |
| 4,154,746 | 5/1979 | Huffman | 252/299.1 |
| 4,179,395 | 12/1979 | Cole, Jr. et al. | 252/299.1 |
| 4,278,323 | 7/1981 | Mukoh et al. | 252/299.1 |
| 4,281,903 | 8/1981 | Gharadjedaghi | 252/299.1 |
| 4,299,720 | 11/1981 | Osman et al. | 252/299.1 |

FOREIGN PATENT DOCUMENTS

| | | | |
|---|---|---|---|
| 2104 | 5/1979 | European Pat. Off. | 252/299.1 |
| 26004 | 4/1981 | European Pat. Off. | 252/299.1 |
| 2920730 | 11/1979 | Fed. Rep. of Germany | 252/299.1 |
| 50-157272 | 12/1975 | Japan | 252/299.68 |
| 51-22681 | 2/1976 | Japan | 252/299.68 |
| 55-25005 | 2/1980 | Japan | 252/299.1 |
| 1556311 | 11/1979 | United Kingdom | 252/299.1 |
| 2037803 | 7/1980 | United Kingdom | 252/299.1 |

OTHER PUBLICATIONS

Tsukamoto, M., et al., Jap. J. Appl. Phys., vol. 14, No. 9, pp. 1307–1312, (1975).
Cox, R. J., Mol. Cryst. Liq. Cryst., vol. 55, pp. 1–32, (1979).
Bloom, A., et al., Mol. Cryst. Liq. Cryst., vol. 40, pp. 213–221, (1977).
Bloom, A., et al., Mol. Cryst. Liq. Cryst., vol. 41, (Letters), pp. 1–4, (1977).
White, D. L., et al., J. Appl. Phys., vol. 45, No. 11, pp. 4718–4722, (1974).

*Primary Examiner*—Teddy S. Gron
*Attorney, Agent, or Firm*—Cruzan Alexander; Donald M. Sell; Jennie G. Boeder

[57] ABSTRACT

A composition for use in liquid crystal display devices, consisting essentially of a nematic liquid crystal material and a helichromic compound possessing both a chromophoric moiety and a helical ordering moiety. The helical ordering moiety is capable of helically ordering the mixture of liquid crystal material and helichromic compound. The helichromic compound can be utilized in conventional "guest-host" and "twist nematic" displays as well as in unique helichromic displays. When used in helichromic displays, the helichromic compounds eliminate after-image scattering and enable the display to be operated at reduced voltages.

33 Claims, 2 Drawing Figures

HELICHROMIC COMPOUNDS AND DISPLAYS

FIELD OF THE INVENTION

This application is a continuation-in-part of copending application Ser. No. 169,275, filed July 16, 1980.

The present invention relates to liquid crystal compositions and liquid crystal display devices. Unique "helichromic" compounds possessing both chromophoric and helical ordering characteristics when used in combination with nematic liquid crystals are disclosed.

BACKGROUND OF THE INVENTION

Liquid crystal display technology has become prominent in recent years due primarily to the popularity of digital displays for a variety of information display functions. Of particular note are the use of such displays in hand-held calculators and digital watches.

While there are several types of liquid crystal displays in use, a particularly advantageous display for certain high performance application is known as the "phase-change" display. This type of display has been described in the literature, e.g. D. L. White and G. N. Taylor, "New Absorptive Mode Reflective Liquid Crystal Display Device", *Journal of Applied Physics*, Vol. 45, pp. 4718-4723, (1974). Briefly, these devices comprise a typical transmissive or reflective liquid crystal display cell having appropriate front and back electrode patterns and features a homogeneously or homeotropically oriented liquid crystal layer comprising host positive nematic liquid crystal, a guest dichroic dye, and an optically active additive in amounts sufficient to provide a cholesteric liquid crystal phase. In the absence of an electric field across the display electrodes, the dichroic dye is oriented to absorb a substantial amount, e.g. 95%, of the unpolarized incident light and the display area exhibits a color characteristic of the dichroic dye. When an electric field is applied to the desired electrode, the liquid crystal layer in register with the electrode is caused to change from a cholesteric phase to a nematic phase in homeotropic alignment due to the positive dielectric anisotropy of the liquid crystal host material. In this state, the dichroic dye in the liquid crystal layer is oriented to absorb relatively little incident light and a "clear" area, corresponding to the electrode area on a colored background, is observed. By selective activation of the electrodes, information can be readily displayed.

Due to its operating mechanism, the phase change display does not require the use of auxiliary polarizers as do other well known types of displays, e.g. twist-nematic and guest-host nematic displays. However, the phase-change displays have a number of inherent disadvantages. One significant negative performance characteristic is the so-called "storage effect" or "after-image scattering" observed when the display is switched from a field-on to a field-off state. Following this transition, the image previously displayed does not immediately disappear, but remains for several seconds or more as a milky pattern which scatters light and may render the displayed information ambiguous, particularly where rapid switching such as in multiplexing, is required. Further, significant amounts, e.g. 5–15% by weight, of the optically active and dichroic additives must be incorporated into the liquid crystal mixture. These "foreign" additives are typically chemically and/or photochemically unstable in liquid crystal display systems and their addition introduces a potential source of harmful decomposition products into the display. In addition, all the optically-active additives of the prior art are nematic liquid crystals and it is well known that liquid crystal systems comprising chemically dissimilar mixtures of liquid crystals have properties which vary nonlinearly and unpredictably with composition and temperature. Thus, typical phase-change liquid crystal mixtures may have properties such as optical anisotropy, phase transition temperature, and electric, magnetic and elastic properties which vary unpredictably.

SUMMARY OF THE INVENTION

The present invention relates to helichromic liquid crystal displays which require no auxiliary polarizers, exhibit rapid decay and no after-image scattering and require significantly reduced additives to obtain such performance. The superior display devices of the present invention can be provided by the use of unique helichromic compounds in admixture with nematic liquid crystals. More specifically, the helichromic compounds of the present invention are organic, nonionic compounds, soluble in nematic liquid crystal compositions, which compounds possess both helical ordering characteristics and chromophoric characteristics when used in combination with nematic liquid crystals.

As used herein, the term "helichromic" may be used to refer to the described helichromic compounds, to liquid crystal compositions containing such compounds and also to display devices containing the compounds of the present invention.

The helichromic compounds of the present invention are characterized by having a chromophoric moiety and a helical ordering moiety in a single molecule. As used in this application, the term "helical ordering moiety" or "helical ordering group" refers to substituents which impart to the helichromic compound helical ordering characteristics such that liquid crystal mixtures in which effective amounts of the helichromic compounds are included will exhibit helical ordering characteristics.

The helichromic displays of the present invention provide increased efficiency when compared with conventional phase-change displays since they operate effectively at lower voltages while exhibiting similar brightness, contrast and speed.

The helichromic compounds of this invention also find use as components of twist nematic and guest-host nematic liquid crystal displays to eliminate optical bounce in a surprisingly efficient manner as will be discussed hereinafter.

DETAILED DESCRIPTION

Figure 1:
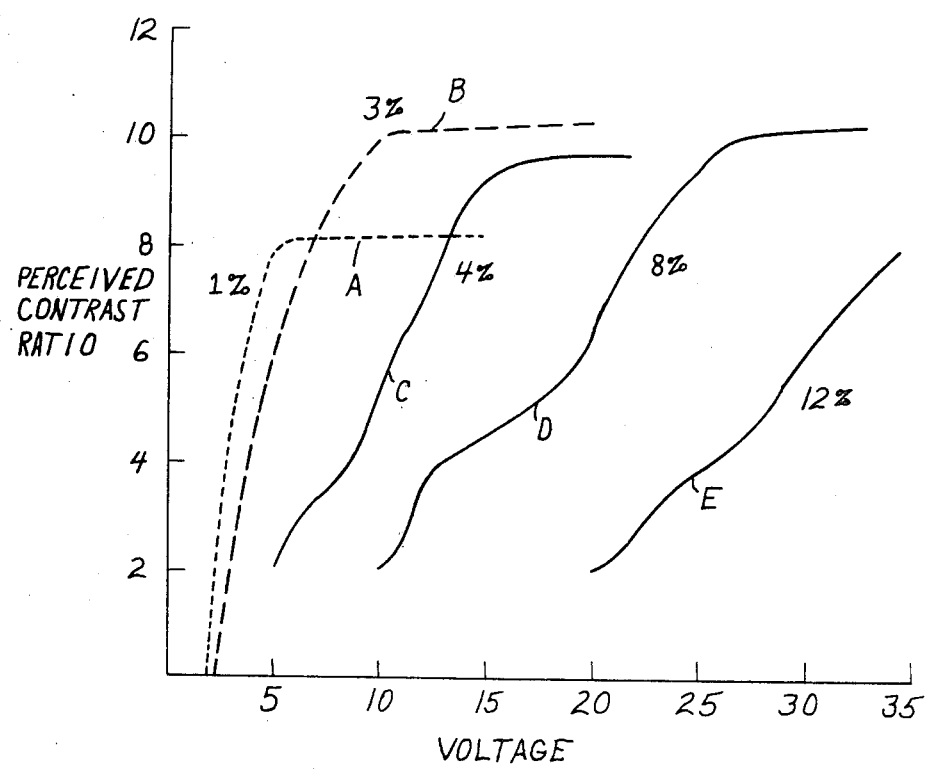
FIGS. 1 and 2 are graphic presentations comparing performance characteristics of the helichromic displays of the present invention with prior art display devices.

The helichromic displays of the present invention derive their superior performance properties from the use of unique helichromic compounds. The helichromic compounds of the present invention are novel, organic, nonionic compounds which are soluble in nematic liquid crystal compositions and which comprise at least one chromophoric moiety and at least one helical ordering moiety in a single molecule.

The chromophoric moieties or groups useful in this invention must be capable of absorbing at least some wavelength of incident electromagnetic radiation, in the visible wavelengths. The useful chromophoric groups are dichroic groups, i.e. groups which have light absorption properties which vary depending on the alignment of the molecule with respect to the vibration mode of incident light, and which are capable of being aligned by nematic liquid crystals. Useful dichroic groups must be capable of being joined with helical ordering moieties and the resulting helichromic molecule must be dichroic in nature and have the ability to be aligned by liquid crystal materials. Exemplary dichroic groups are groups which are characteristic of the well known azo, azo-stilbene, benzothiazolylpolyazo, azo-methine, methine, merocyanine, anthraquinone, and methine-arylidene families of dyes.

Suitable helical ordering moieties or groups are those groups which impart helical ordering characteristics to the helichromic compound as discussed hereinabove. The useful groups must cause the liquid crystal mixture in which the helichromic compound is included, to have a positive (+) or negative (−) helical ordering characteristic of less than infinite pitch when the helichromic compound is present in concentrations at or below its solubility limits. The conditions required to induce optical rotation generally follow the rule of Brewster (Brewster, J., J.A.C.S., 81, 5475, 5483 and 5493 (1959), and involve the presence of a chiral group, e.g. one having an asymmetric carbon atom. Preferred helical ordering groups include 2-methyl and 3-methyl alkyl groups citronellyl, camphanyl, 3-methyl cyclohexyl, α-methyl benzyl, and the like. They are particularly preferred if in the (+) form.

Preferred helichromic compounds of the present invention can be represented by the general formula

$$Q-(Z)_n$$

wherein Q is a dichroic group, Z is a helical ordering group and n is an integer having a value of one or more and is preferably an integer from 1 to 4. As noted above, preferred dichroic groups, Q, are groups which are characteristic of the azo, azo-stilbene, benzothiazolyl-polyazo, azo-methine, methine, merocyanine, anthraquinone and methine-arylidene families of dyes which are per se well known in the art and which will be described in greater detail hereinafter. Preferred helical ordering groups, Z, are organic groups containing an asymmetric carbon atom such as the (+)-2-methyl alkyl and (+)-3-methyl alkyl groups wherein alkyl is preferably a lower alkyl of 2 to about 8 carbon atoms, (+)-citronellyl, (+)-camphanyl, (+)-3-methyl cyclohexyl, and α-methylbenzyl.

The number, n, of helical ordering groups, Z, which can be substituted on the chromophoric group, Q, is dependent on the number and position of reactive sites available on the dye from which Q is derived. For example, when Q is an azo, azo-stilbene, benzothiazolyl polyazo, merocyanine, azo-methine-based, methine, or methine-arylidene group, n is preferably 1 or 2 and the helical ordering group, Z, is substituted in a position along the long axis of Q so as not to significantly decrease its effectiveness as a dichroic dye. When Q is an anthraquinone-based group, the anthraquinone skeleton is normally substituted in one or more of the 1, 4, 5 and 8 positions with helical ordering groups. However, when the anthraquinone is substituted with two $NH_2$ groups in either the 1 and 4, or 5 and 8 positions, the 2 and 3, or 6 and 7, positions of the anthraquinone skeleton, respectively, may be substituted with a cyclic dicarboximide group having a helical ordering group attached to the nitrogen. Other ballasting or auxochromic groups which may affect the order parameter or absorption band of the chromophoric moiety are permitted substituents in the remainder of the available positions as is known in the art. The preparation and structure of preferred helichromic compounds will be discussed in greater detail hereinafter.

The helichromic compounds of the present invention can be combined with, and are soluble in, nematic liquid crystal compositions which are per se known in the art. The nematic liquid crystals can have either a positive or negative dielectric anisotropy. Generally liquid crystals having higher absolute values of dielectric constant are preferred. At this time the positive nematic materials having high dielectric constants are more readily available and for convenience are referred to for purposes of illustration herein. Mixtures of positive and negative materials are also useful, particularly those mixtures having a net positive dielectric anisotropy. As used herein the term "positive" or "negative" refers to the net dielectric anisotropy where mixtures are used.

Readily available positive nematic liquid crystal materials which have been found suitable are trans-4-n-pentyl-(4'-cyano-phenyl)-cyclohexane, trans-4-n-pentyl-(4'-cyano-biphenyl-4)-cyclohexane, p-n-hexylbenzylidene-p'-amino-benzonitrile, p-methoxybenzylidene-p'-amino-benzonitrile, p-ethoxybenzylidene-p'-aminobenzonitrile, p-cyano-benzylidene-p'-n-butyoxyaniline, p-cyanobenzylidene-p'-octyloxyaniline, 4-cyano-4'-alkyl(or alkoxy)biphenyl, 4-cyanophenyl-4'-alkyl(or alkoxy)-benzoate, 4-alkyl(or alkoxy)phenyl-4'-cyanobenzoate and including the family of alkyl phenyl pyrimidines.

Eutectic mixtures and combinations of all the above are also useful. Illustrative are eutectic mixtures of 4'-substituted 4-cyanobiphenyls wherein the 4' substituents are alkyl or alkoxy of 3 to 8 carbon atoms. Representative is the commercially available "E-7" mixture from B.D.H. Ltd. Yet another useful mixture of compounds comprises mixtures of the phenylcyclohexanes referred to above such as mixtures comprising the 4-alkyl-(4'-cyanophenyl)cyclohexanes, mixtures comprising 4-alkyl-(4'-cyanobiphenyl)cyclo-hexanes, and mixtures comprising both types of compounds. One useful commercial mixture is a four-component mixture available from EM Laboratories, Inc., identified as Nematic Phase 1132 TNC "Licristal". This mixture comprises by weight approximately:

14% trans-4-n-pentyl-(4'-cyanobiphenyl)cyclohexane,
26% trans-4-n-propyl-(4'cyanophenyl)cyclohexane,
36% trans-4-n-pentyl-(4'-cyanophenyl)cyclohexane, and
24% trans-4-n-heptyl-(4'-cyanophenyl)cyclohexane.

Other positive nematic materials and compositions useful in the practice of the present invention are phenylbenzoate esters, available under the tradename "EK-11650" from Eastman Organic Chemicals, Eastman Tenn., and "ZLI" from E. Merck, Darmstadt, Germany; and compositions including these compounds in dominating amounts such that the compositions are provided with a net dielectrically positive anisotropy.

Representative of nematic liquid crystals having negative dielectric anisotropy which would be useful in the present invention is the liquid crystal "EN-18" developed by Chisso Corporation.

Helichromic devices of the present invention are similar to liquid crystal display devices of the prior art in that they comprise two plates of glass of nominal thickness spaced from a few microns to a few tens of microns apart in a parallel configuration. A spacer or confining gasket material is placed between the two glass plates around the periphery in order to form an air tight, substantially water impermeable bond with the glass surfaces. The inner surfaces of each glass plate are coated with a thin film of for example, indium/tin oxide to form a conductive electrode surface. The electrode pattern which is desired may be produced by silk screen or photolithographic techniques which are well-known in the art. The surfaces of each inwardly facing electrode pattern are treated using techniques known in the art to insure that the helichromic-liquid crystal mixture is homeogeneously or homeotropically oriented. Homeotropic alignment is preferred, i.e., that the molecules are aligned perpendicular to the electrode surfaces. Generally, methods of homeotropic orientation comprise coating of the cell inner walls with an agent such as an organosilane coupling agent, a polymer surfactant, or metal oxides such as silicon monoxide at normal angles to the surface. The helichromic displays of the present invention, in the absence of an electric field, propagate unpolarized light through two elliptical modes, which result in the absorption of both vectors of light and the transmission of the characteristic color of the helichromic compound. In the presence of an electric field selectively applied across electrodes the helichromic and liquid crystal molecules between the electrodes no longer possess helical ordering characteristics, and minimum absorption of light is observed. Thus, liquid crystal displays containing a sufficient concentration of the helichromic compounds alternate between a helichromic-compound-colored state and a clear state, between the electrodes, when in the on and off state respectively. A plurality of helichromic compounds may be used to produce a display which appears black in the absence of an electric field, i.e., essentially all visible wavelengths of light are absorbed equally, and transparent in the presence of an electric field, i.e., all the dyes exhibiting minimum absorption.

It is a characteristic of the helichromic devices of the present invention that no auxiliary polarizer is required. Thus, these helichromic devices have brightness characteristics equivalent to phase change displays and superior to twist nematic liquid crystal devices, which require two polarizers, or guest-host liquid crystal devices which require one auxiliary polarizer. In addition, the helichromic devices of the present invention display rapid decay times, i.e., no after-image scattering, and may be operated at voltages lower than those required to operate traditional phase change devices.

As discussed hereinabove, the preferred helichromic compounds of the present invention can be represented by the general formula $$Q-(Z)_n$$

wherein Q is preferably a dichroic azo, azo-stilbene, benzothiazolyl polyazo, merocyanine, azo-methine, methine, methine-arylidene or anthraquinone group, Z is a helical ordering moiety and n is an integer having a value of one or more and is preferably from 1 to 4.

The helical ordering moiety Z, may be linked to the dichroic moiety Q by organic linking groups. Preferred linking groups include: —CH=N—, —CH=CH—, —N=N—, —NH—, —N(alk)—, —O—, —S—, —(CH$_2$)$_p$—, —C(CH$_3$)$_2$—,

—C$_6$H$_{10}$—, phenyl, naphthyl groups, cyclic dicarboximide groups, and combinations thereof, wherein p is 1, 2, 3, 4, or 5.

The dichroic moiety Q may be substituted in a number of available positions with one or more additional ballasting groups. Exemplary ballasting groups include NH$_2$, —(CH$_2$)$_p$—CH$_3$, —O—(CH$_2$)$_p$CH$_3$, —CH(CH$_3$)$_2$,

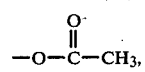

C$_6$H$_{11}$, phenyl groups, naphthyl groups, and combinations thereof, wherein p is 1, 2, 3, or 4.

In addition, Q may be substituted in any available position on any aromatic ring by small side groups which influence color absorption and solubility of the helichromic compound. Exemplary of such side groups are lower alkyl groups, lower alkoxy groups, F, Cl, Br, NO$_2$ NH(alk), N(alk)$_2$, OH, CN, CF$_3$ and CH$_3$.

Exemplary dichroic groups of the azo and benzothiazolyl polyazo types include the following:

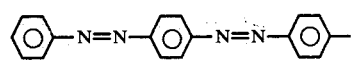

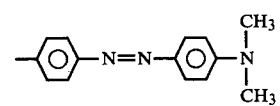

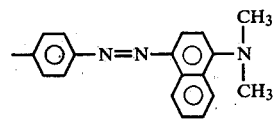

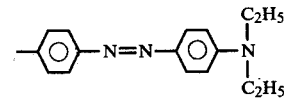

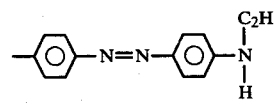

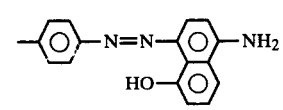

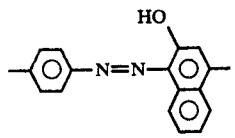
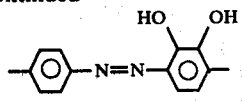
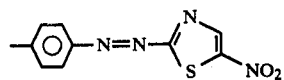
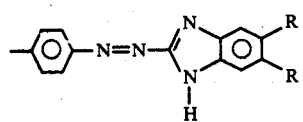
R = lower alkyl (C₁–C₄)
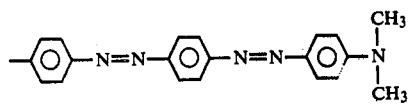
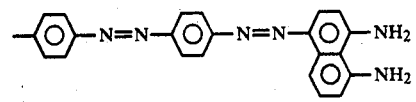
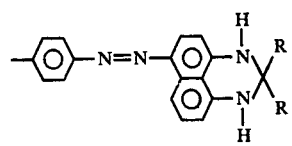
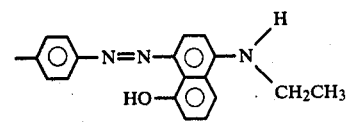
R = CH₃, CH₂CH₃
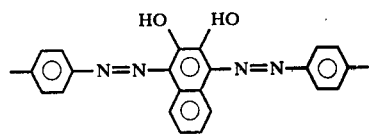
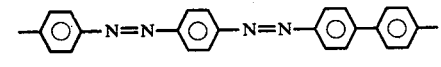
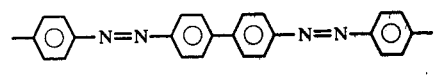
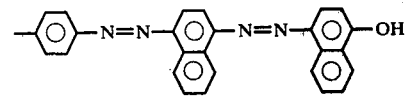
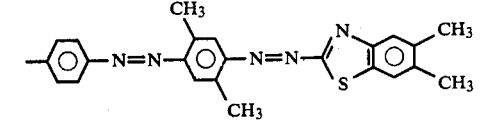
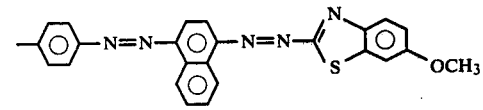
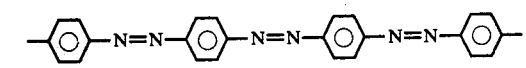
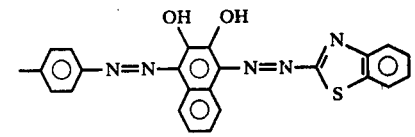
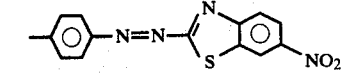
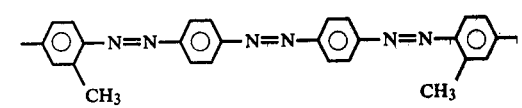
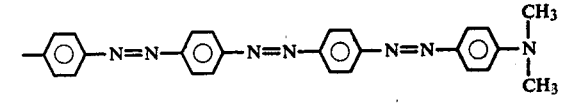

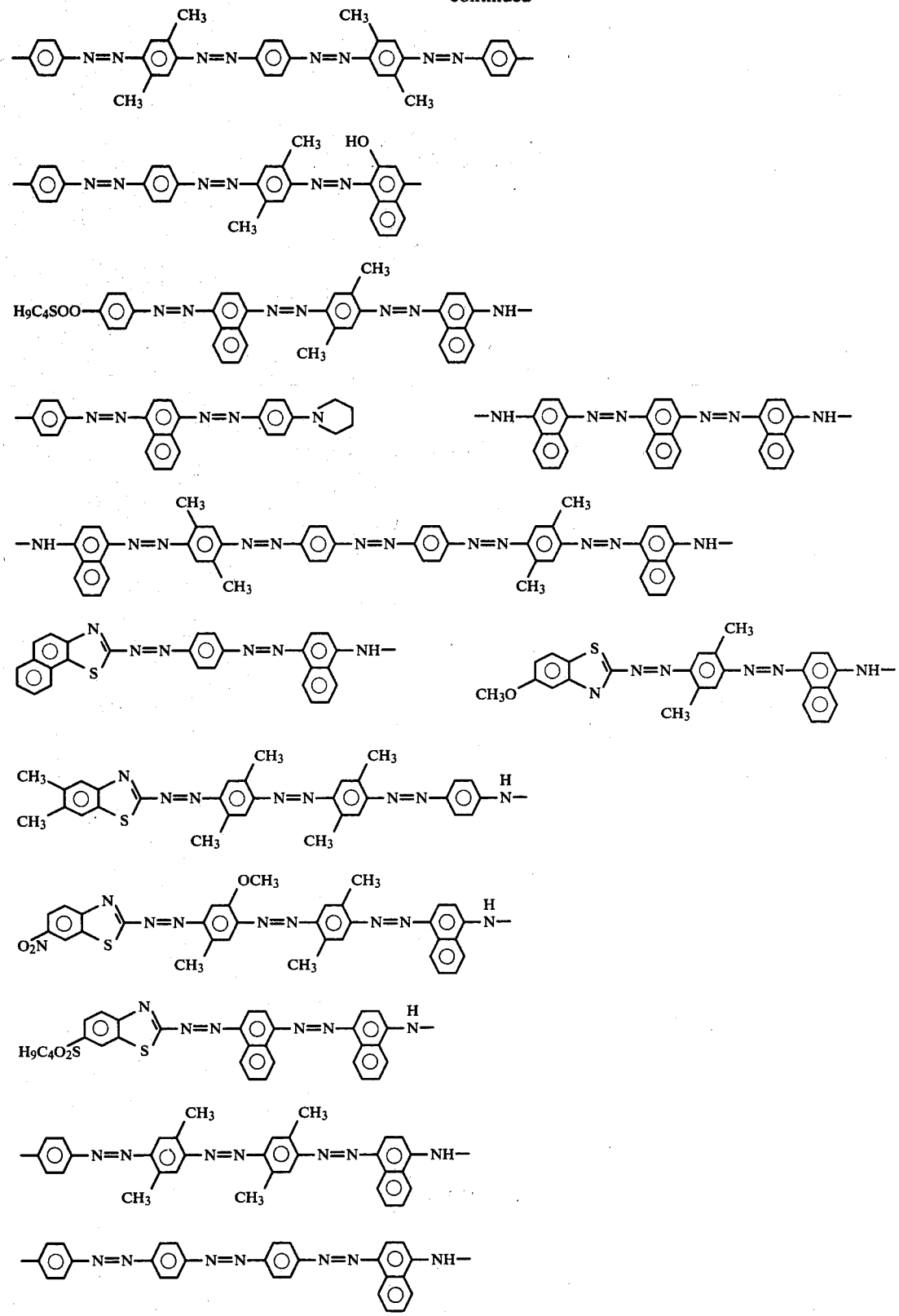
Exemplary dichroic groups of the azo-stilbene type include the following:

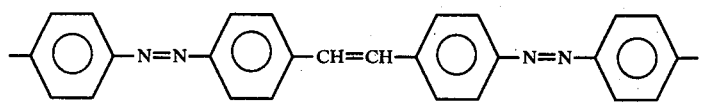
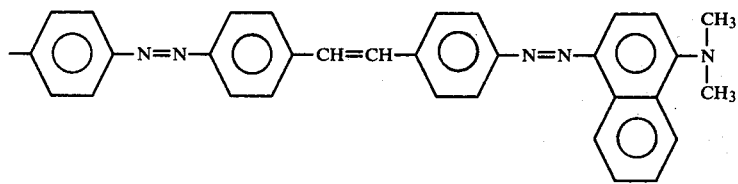
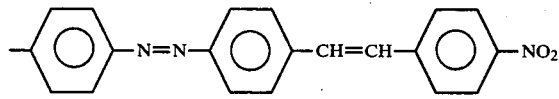
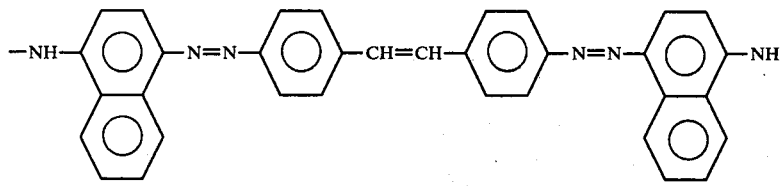
Exemplary dichroic groups of the azo-methine type include the following:
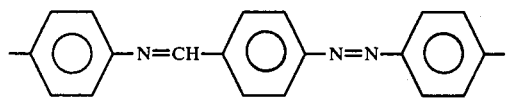
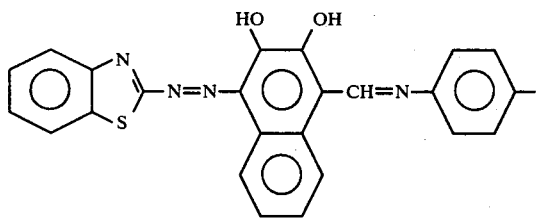
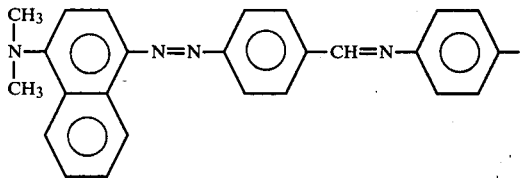
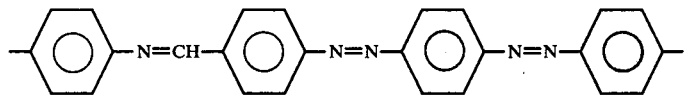
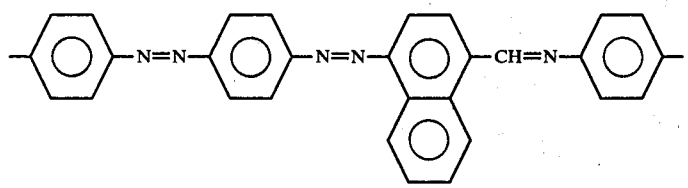

-continued
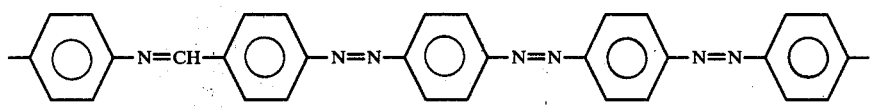
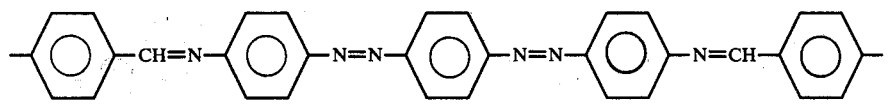
Exemplary dichroic groups of the methine type include the following:
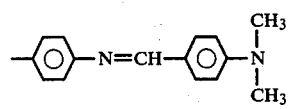
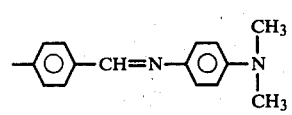
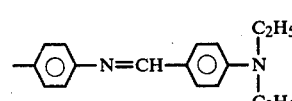
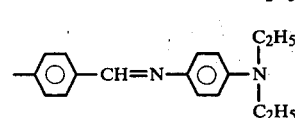
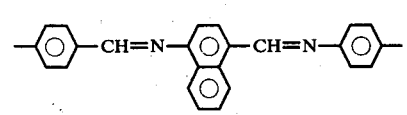
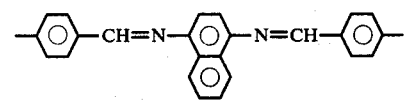
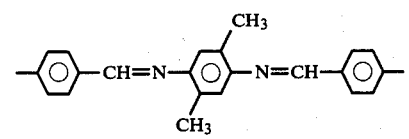
Exemplary dichroic groups of the methine-arylidene type include the following:
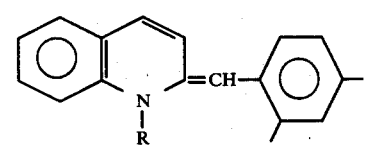
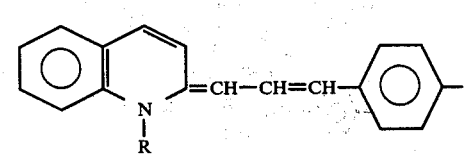
-continued
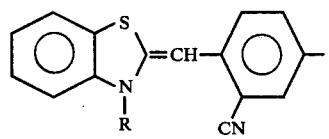
R = —CH$_3$, —C$_2$H$_5$, etc.
Exemplary dichroic groups of the merocyanine type include:
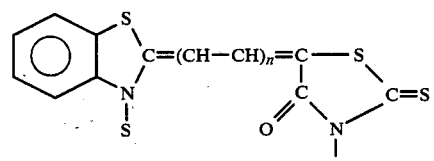
n = 1, 2 or 3.
Exemplary dichroic groups of the anthraquinone type include the following:
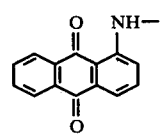
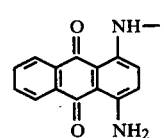
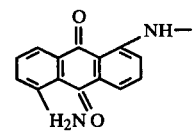
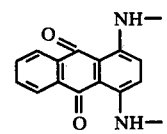
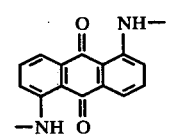

-continued
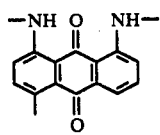
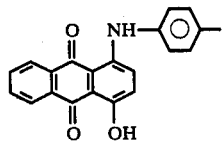
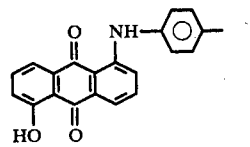
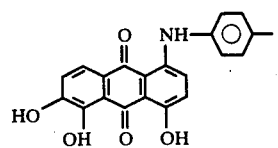
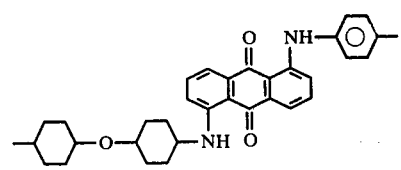
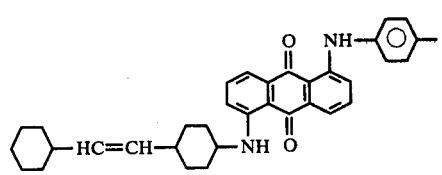
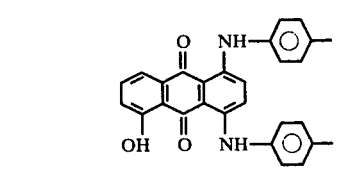
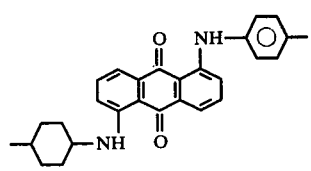
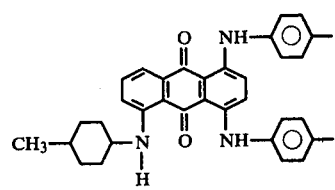
-continued
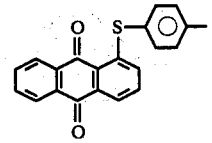
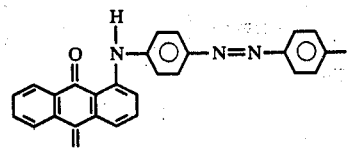
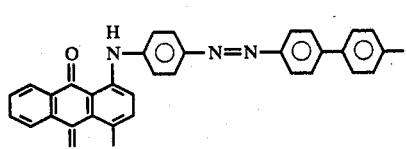
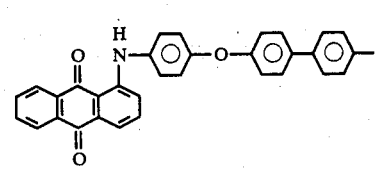
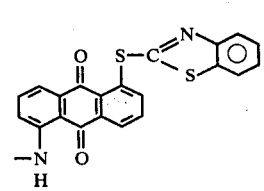
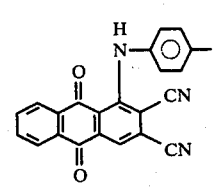
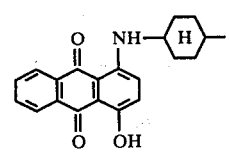
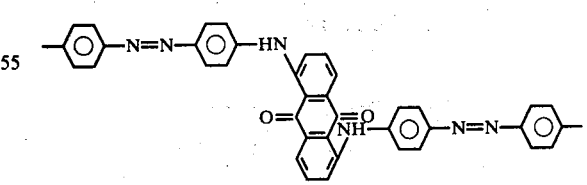
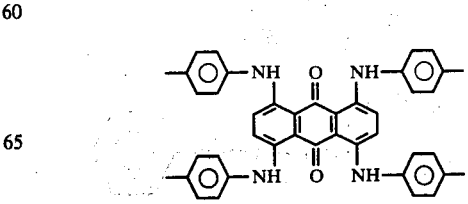

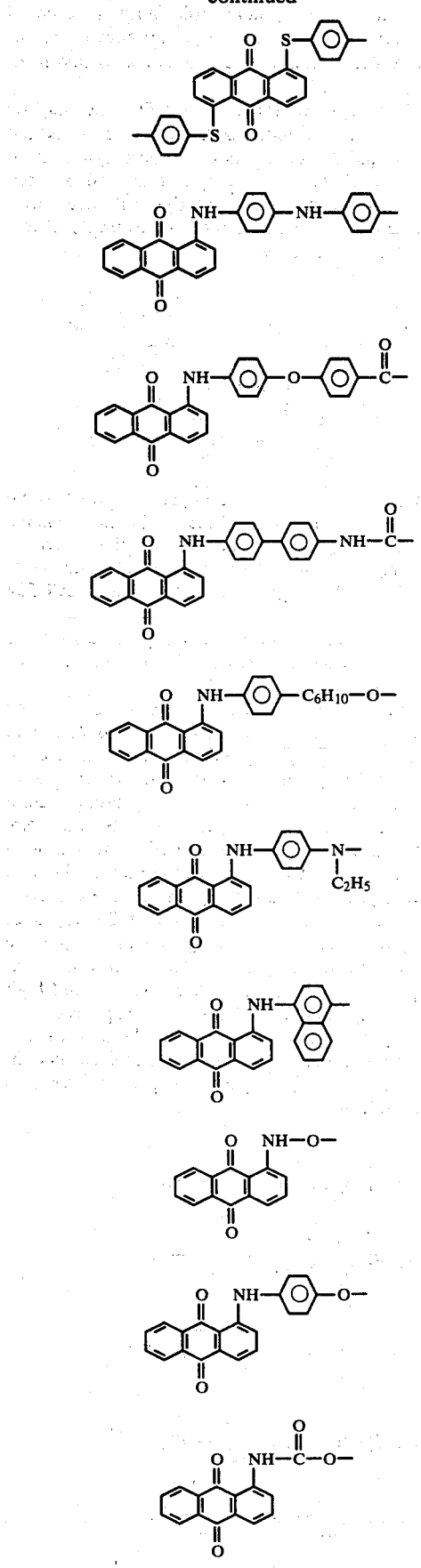

The helichromic azo and azo-stilbene dyes of this invention may be synthesized using methods of diazotization normally employed to synthesize other azo and azo-stilbene dyes. The literature abounds with methods of diazotization and specific organic synthetic procedures relating to diazotization and coupling reaction schemes. Helichromic azo and azo-stilbene type dyes may be synthesized by direct diazotization of the (+) chiral aniline. Preferred optically-active anilines have a para substituted (+)-2-methylbutyl group, (+)-3-methyl butyl group, (+)-citronellyl group, (+)-camphanyl group, (+)-3-methyl cyclohexyl group, or (+)-α-methyl benzyl group. However, other useful chiral anilines may have the optically active group in the ortho or meta ring positions. Additional substituents, other than amino groups, may be present on the ring such as methyl, nitro, cyano, and hydroxy groups. The preparation of (+)-p-amino-2-methylbutylbenzene, i.e., (+) chiral aniline, is shown in D. Dolphin and Z. Muljiani, Journal of Chemical Physics, Vol. 58 [2], 414 (1973).

Alternatively the nitroso derivative of the chiral aniline may be utilized to synthesize azo-type helichromic dyes by coupling with an amino compound.

Diazotization using alkali metal nitrite in mineral acid or using nitrosylsulfuric acid is also effective in the practice of the present invention, and those skilled in the art and science of synthetic chemistry will appreciate the various techniques involved.

Helichromic polyazo dyes may be synthesized by sequential diazotization and coupling. Reference is made to U.S. Pat. No. 4,145,114, for detailed procedures. Other pertinent references include U.S. Pat. Nos. 4,032,219; 4,029,392; 4,027,950; and 4,116,861.

Helichromic polyazo dyes may also be synthesized by tetraazotization of a polyaryl diamine and subsequent coupling with a chiral nitroso benzene group. Examples of useful polyaryl diamines include

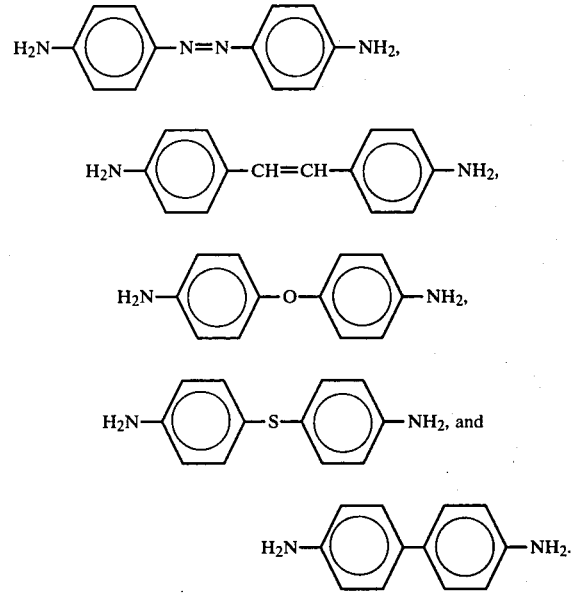

Helichromic polyazo dyes having more than one chiral group may be obtained by reacting a helichromic azo compound with a chiral nitroso compound, obtained by oxidation of the corresponding chiral aryl amine with caros acid (the procedure is taught in Hickenbottom, *Organic Synthetic Chemistry*, Vol. II, p. 310 (1956), in a minimum quantity of glacial acetic acid.

Helichromic benzothiazolyl polyazo dyes may be obtained by converting benzothiazolyl amines to the corresponding diazotate by the use of organic alkyl nitrites. The diazotate is then coupled to an aniline in weak acid and the benzothiazolyl azoaniline dye intermediate is recovered. Further diazothization and coupling to chiral anilines yields helichromic compounds. Particularly preferred benzothiazolyl polyazo dye precursors are disclosed in Applicant's copending patent application U.S. Ser. No. 216,010.

Helichromic dyes of the methine type may be synthesized by combining equivalent molar amounts a chiral aniline and an aromatic aldehyde (which may also have a chiral substituent) condensing in acetic acid, and heating.

Helichromic dyes of the azo-methine type may be synthesized by several methods known to those skilled in the art. Usually such methods involve synthesis of (+)-4—2-methylbutyl)benzaldehyde followed by condensation with various amino azo dye intermediate to produce a chiral azo-methine dye. An example of this method is illustrated below.

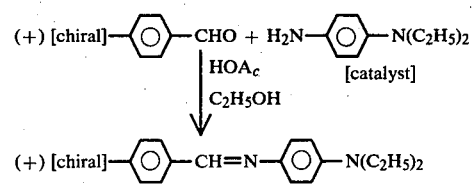

Helichromic dyes of the merocyanine type may be prepared by known methods of reacting a merocyanine dye precursor using a chiral halide. Exemplary merocyanine dye precursors are described in The Chemistry of Synthetic Dyes, Monograph No. 127, pages 249–254 (1955).

Helichromic dyes of the methine-arylidene type are synthesized as shown in U.S. Pat. No. 4,033,948, incorporated herein by reference.

Helichromic anthraquinone type dyes useful in the present invention may be synthesized by substituting an optically-active amino group onto a dichroic anthraquinone starting compound. Useful dichroic anthraquinones are disclosed in Applicant's copending patent application U.S. Ser. No. 70,421, in U.S. Pat. No. 3,960,750, and in U.S. Pat. No. 3,960,751. It is known that anthraquinones substituted with certain arylamino, heterothio, arylthio, or aminoalkyl groups are dichroic.

Helichromic anthraquinone dicarboximide type dyes may be synthesized by cyclizing the anthraquinone dicarboxylic acid or anhydride with a chiral amine at high temperatures, i.e., greater than 150° C., and high pressures, i.e., greater than about 10 atmospheres.

Exemplary chiral amines which may be used as substituents on an anthraquinone skeleton to form helichromic anthraquinone-type dyes of the present invention include the following:

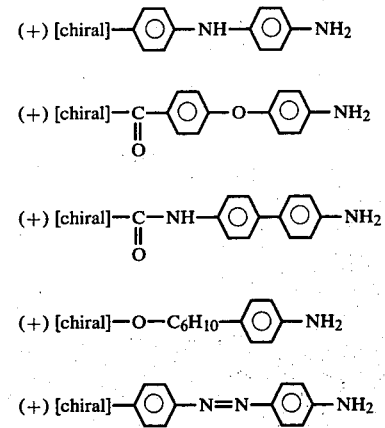

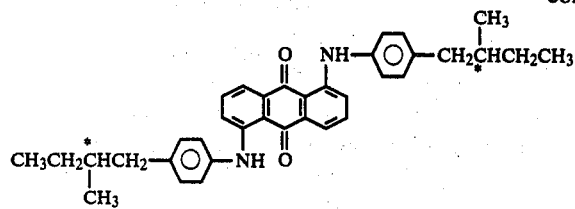 (+)
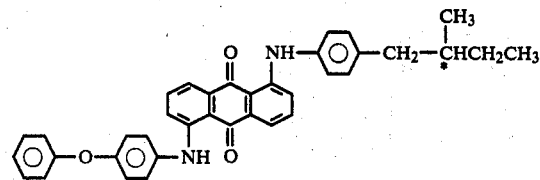 (+)
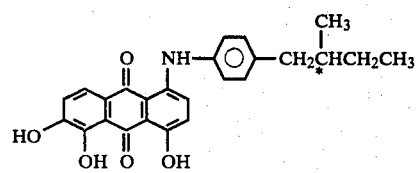 (+)
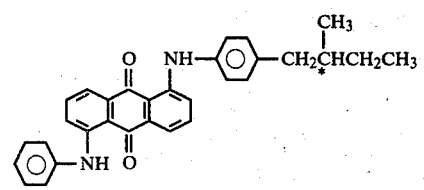 (+)
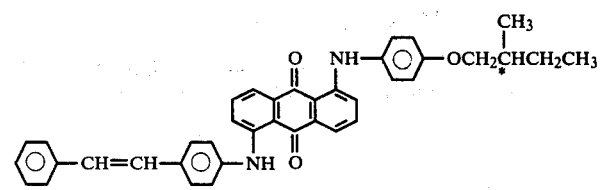 (+)
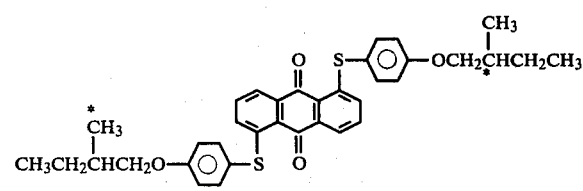 (+)
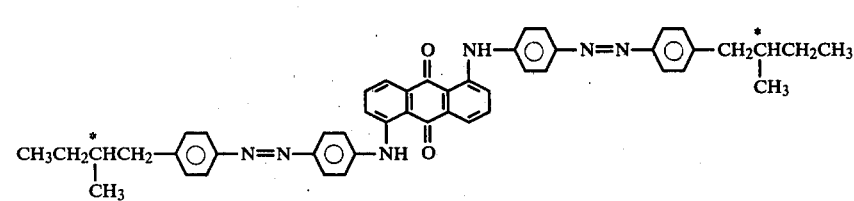 (+)
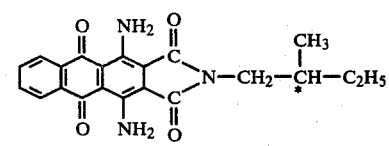 (+)
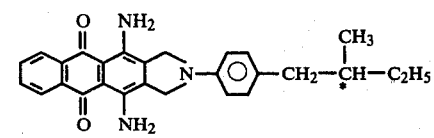 (+)

-continued

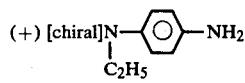 (+) [chiral]

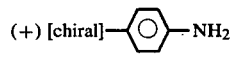 (+) [chiral]

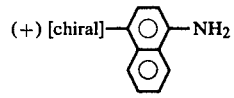 (+) [chiral]

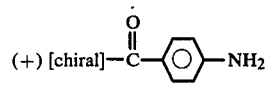 (+) [chiral]

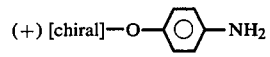 (+) [chiral]

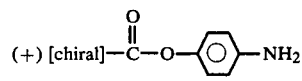 (+) [chiral]

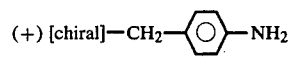 (+) [chiral]

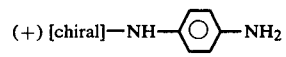 (+) [chiral]

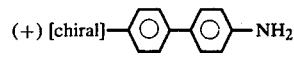 (+) [chiral]

-continued

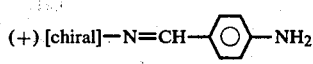 (+) [chiral]

An example of a synthesis of a helichromic anthraquinone-type dye of the present invention is the following:

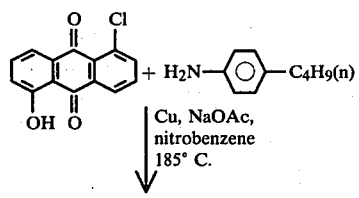

Cu, NaOAc, nitrobenzene 185° C.

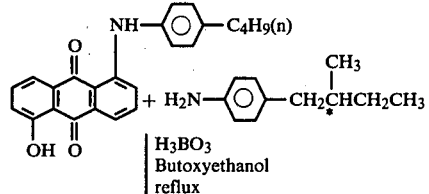

$H_3BO_3$ Butoxyethanol reflux

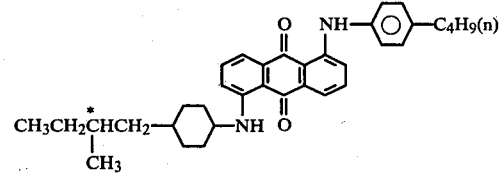

Particularly preferred helichromic compounds of the present invention include the following:

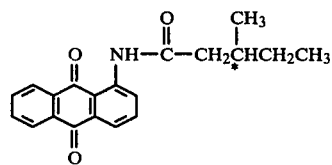 (+)

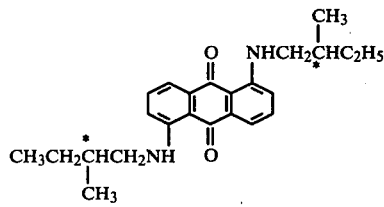 (+)

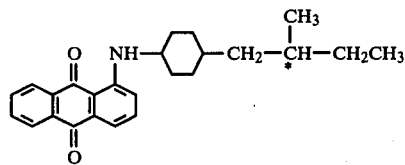 (+)

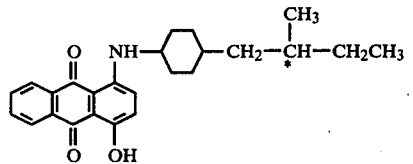 (+)

-continued
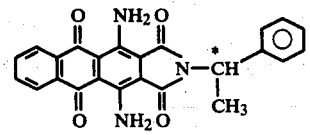 (+)
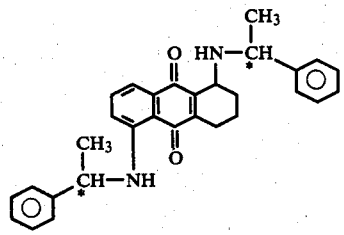 (+)
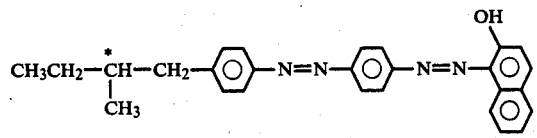 (+)
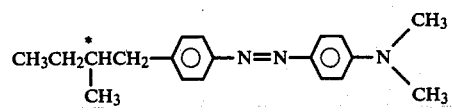 (+)
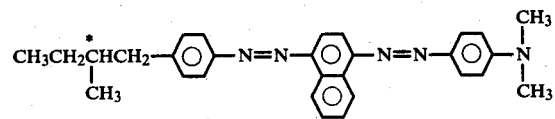 (+)
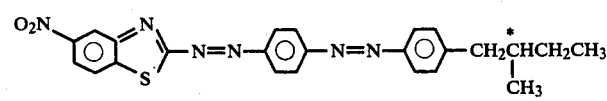 (+)
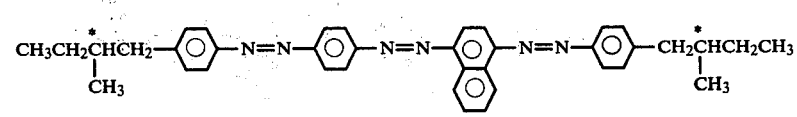 (+)
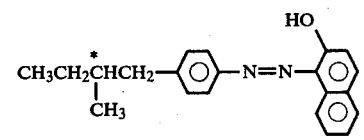 (+)
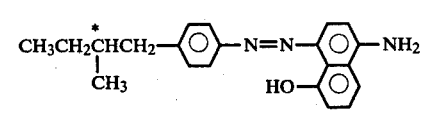 (+)
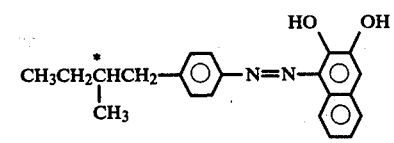 (+)
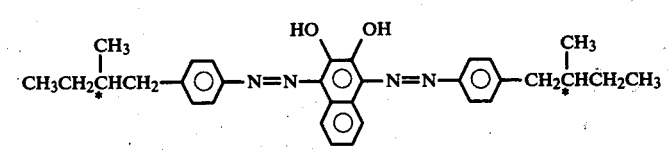 (+)

-continued
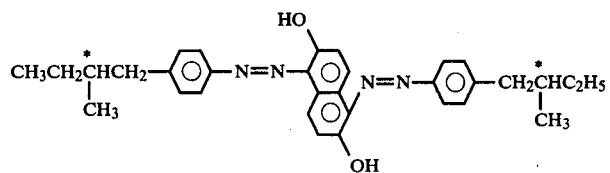 (+)
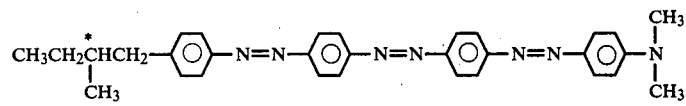 (+)
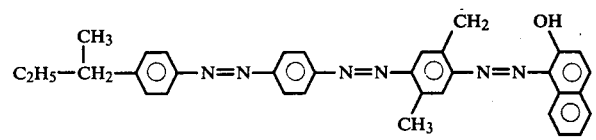 (+)
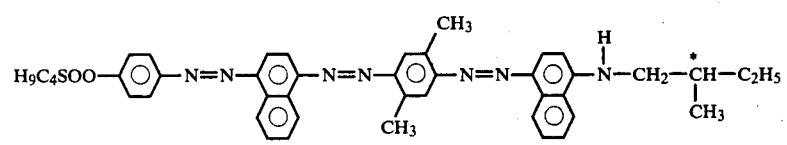 (+)
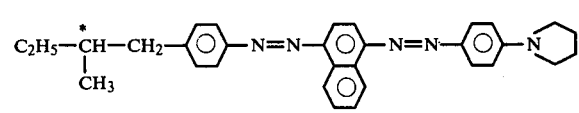 (+)
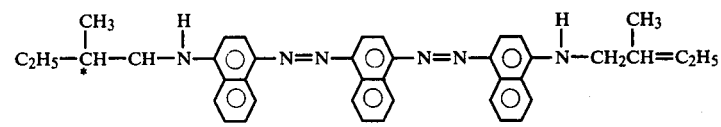 (+)
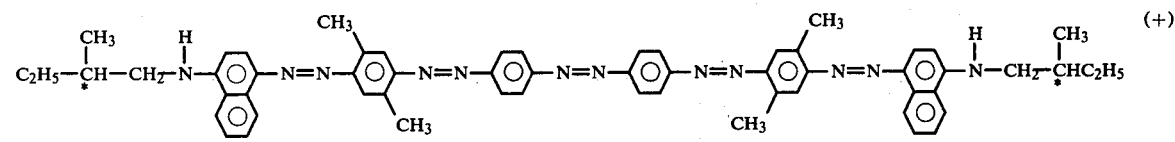 (+)
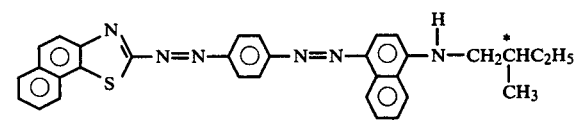 (+)
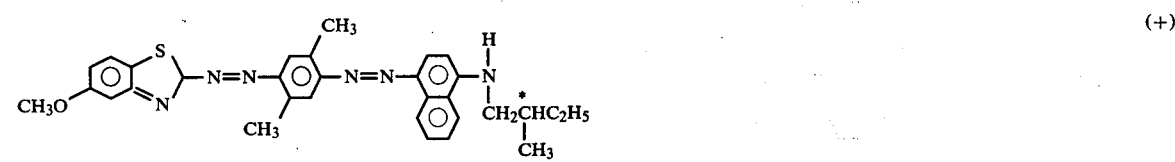 (+)
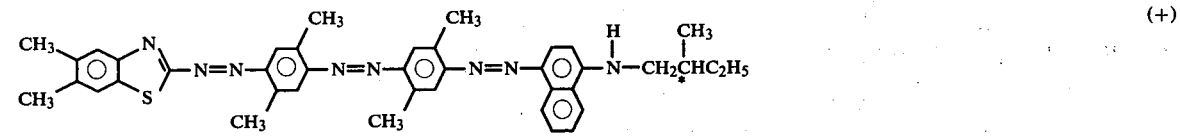 (+)
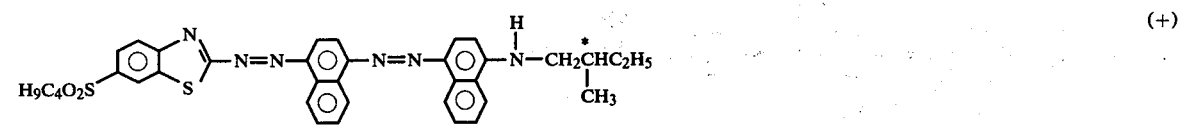 (+)

-continued
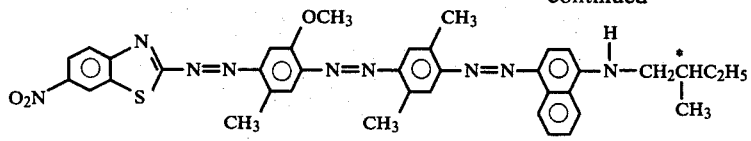 (+)
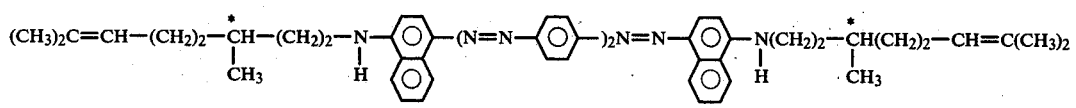 (+)
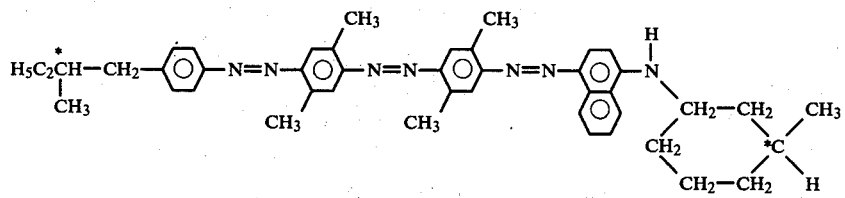 (+)
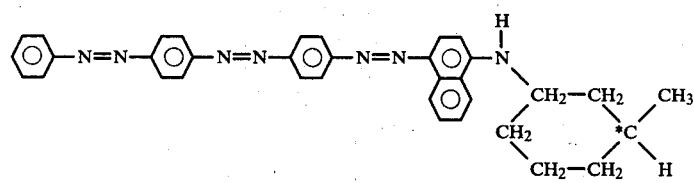 (+)
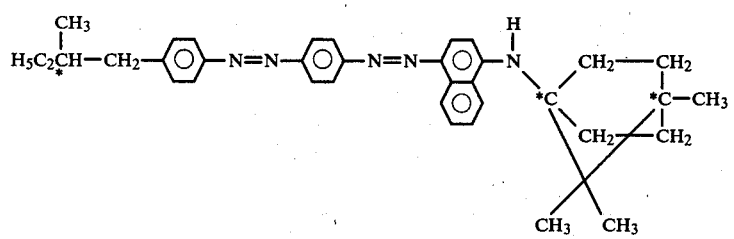 (+)
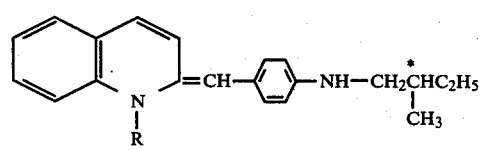 (+)
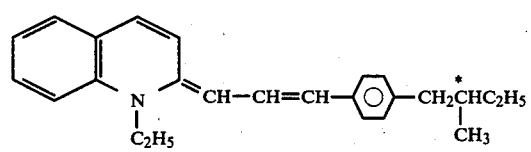 (+)
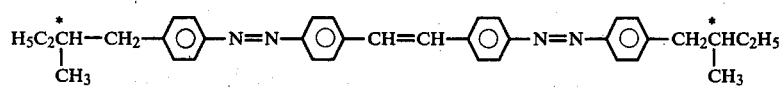 (+)
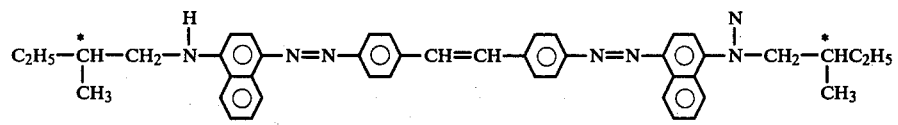 (+)
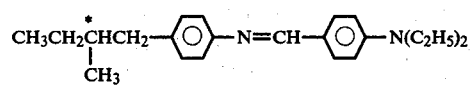 (+)
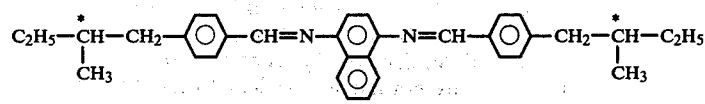 (+)

-continued

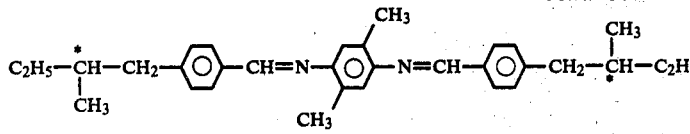

(+)

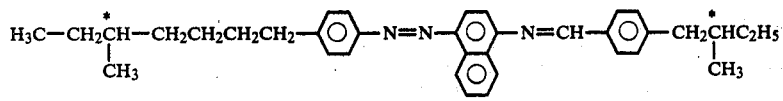

It is believed that the helichromic compound must be present in the helichromic displays in a quantity sufficient to assure that incident unpolarized light is propagated through two elliptical modes, and that both vectors of light are absorbed. The amount of helichromic compound required to induce such a pitch is dependent upon the size of the helichromic compound and the number of helical ordering sites. A longer helichromic molecule will result in a twisted helix formation at a lower concentration than will a relatively shorter helichromic molecule. In addition, a helichromic dye molecule having two helical ordering sites will effect the produce displays having high contrasts. The determination of the optical order parameter, S, is discussed in the Journal of Applied Physics, Vol. 45, No. 11, 4718–23 (1974). $S=(A_o-A_1)/(A_o+2A_1)$ wherein $A_o$ is the absorbance in the absence of an electric field and $A_1$ is the absorbance in the presence of an electric field. S is a value something less than 1 and preferably is very close to 1. Values of S greater than 0.5 and preferably greater than 0.65 insure contrasts of between 5:1 and 10:1.

The S values and absorption maximum for several of the helichromic compounds of the present invention are shown in Table I.

TABLE I

| Helichromic Compound | (nm) | S |
| --- | --- | --- |
| ![structure 1] | 590 | 0.63 |
| ![structure 2] | 580 | 0.72 |
| ![structure 3] | 625 | 0.63 |
| ![structure 4] | 450 | 0.60 | twisted helix formation at a lower concentration than an analogous helichromic molecule having only one helical ordering site.

Typically, the quantity of helichromic compound which will assure absorption of both vectors of light is between 1 and 5 percent and preferably 2 and 3 percent by weight of the bulk nematic liquid crystal material.

The helichromic compounds of the present invention have, in general, relatively high values of the optical order parameter S. This parameter is a measure of the efficiency with which the compound is oriented by the liquid crystal material and is directly related to the contrast one observes when viewing the device. In general, dyes having high optical order parameters The helichromic dyes of the present invention are generally more stable than the optically-active cholesterol derivatives typically used in phase change devices. The helichromic dyes of the present invention are chemically-photochemically stable in liquid crystal display systems, i.e., moisture and ultraviolet light will not readily destroy the molecule, as is the case with certain cholesterol derivatives, such as cholesteryl nonanoate.

In addition, since the helichromic dyes of the present invention are not themselves liquid crystalline, they do not substantially alter the thermodynamic properties of the liquid crystal mixture to which they are added, as do traditional optically active additives.

Another significant advantage of devices utilizing the helichromic dyes of the present invention is that the liquid crystal material need be adulterated with relatively less foreign additive, i.e. helichromic compound than do conventional phase-change devices, thereby reducing potential sources of device decomposition. In general, substantially more dichroic dye and optically active material must be present in phase-change displays to attain equivalent contrast as compared to displays containing only between 0.1 and 5% by weight helichromic compound.

The helichromic displays of the present invention provide a significantly improved display due, in part, to the elimination of after-image scattering. The elimination of after-image scattering is illustrated in FIG. 2.

Figure 2:
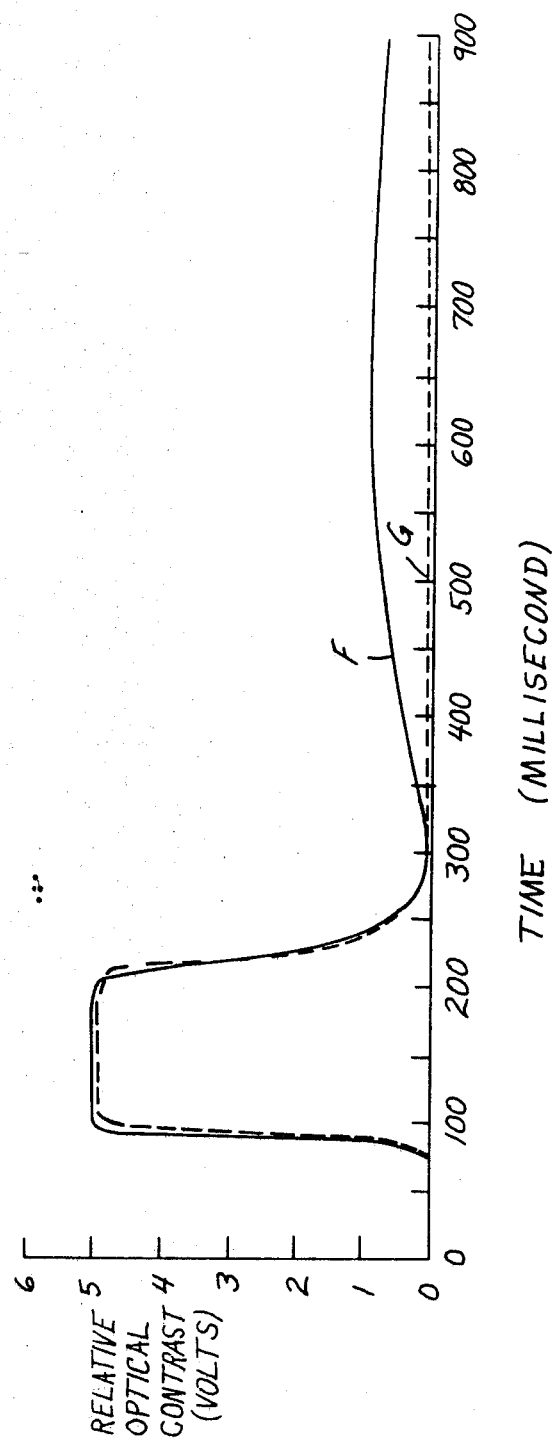

Referring to FIG. 2, the solid line F represents the optical response of a conventional "phase-change" type liquid crystal display containing nematic liquid crystal material, 2 percent by weight dichroic dye, and 10 percent by weight of the optically-active additive, cholesteryl nonanoate. The dotted line G represents the optical response of a display containing the same nematic liquid crystal material and 2 percent by weight of a helichromic compound analogous to the dichroic dye in the phase-change device. Each display was illuminated and subjected to a voltage of 10 V at time 0. After 200 milliseconds the voltage across each cell was reduced to 0. The resultant optical response of each cell was traced with an oscilloscope and appears as FIG. 2. The cell containing the helichromic dye exhibited no after-image scattering of light approximately 75 milliseconds (T=275 ms.) after the voltage was eliminated. In comparison the cell containing the dichroic dye and cholesteryl nonanoate continued to show significant after-image scattering of light even 700 milliseconds (T=900 ms.) after the voltage was removed. Thus, FIG. 2 illustrates that phase change displays utilizing the helichromic dyes of the present invention have rapid decay times with no after-image scattering as compared to the "phase-change" displays of the prior art. Further details regarding FIG. 2 appear in Example 36, hereinbelow.

By use of the helichromic compounds of the present invention the voltage required to produce a device having an equivalent contrast is less than one-half that required with a conventional "phase-change" composition. Table II illustrates the relatively low voltage requirements of helichromic displays.

TABLE II

|  | Contrast Ratio | Brightness | Voltage Required(rms) |
|---|---|---|---|
| Conventional phase change device utilizing 10% cholesterol nonanoate in "E-7". | 5:1 | 30% | 30 |
| Device utilizing the 2% helichromic compound "E-7" | 5:1 | 30% | 7 |

FIG. 1 illustrates that helichromic displays require less voltage to reach any particular perceived contrast ratio than do conventional phase-change compositions. Curves C, D, and E represent the optical response of cells containing 4.5 percent by weight dichroic dye and 4, 8 and 12 percent by weight cholesteryl nonanoate, respectively, in "E-7" liquid crystal material. Dotted curves A and B represent the optical response of cells containing 1 and 3 percent by weight, respectively, of a helichromic compound analogous to the dichroic dye in "E-7". The voltage required to reach any particular contrast ratio (the threshold voltage), is relatively lower for the helichromic devices than for any of the phase-change devices. In addition, FIG. 1 illustrates that helichromic displays require less foreign additives than traditional phase-change displays to reach any particular perceived contrast ratio. Further details regarding FIG. 1 appear in Example 37, hereinbelow.

Helichromic compounds of the present invention may be utilized in so-called "guest-host" liquid crystal displays, when present in concentrations insufficient to provide the mixture with helical ordering characteristics. The construction of "guest-host" liquid crystal displays is described in *Applied Physics Letters*, Vol. 13, pages 91–92 (1968). In guest-host devices a "host" liquid crystal material has its orientation controlled by the application of electrical fields and in turn interacts with "guest" dichroic dye molecules to induce a cooperative conforming alignment.

Guest-host type displays in the "off" state require one polarizer to absorb one polarization of incident light while the guest dichroic material in the display absorbs the other polarization. In the "on" or "bright" state the host liquid crystal material, and thus the guest dye molecules, are oriented by the electric field so that the dichroic dye molecules assume their essentially nonabsorbing state.

The concentration of helichromic compound required to be present in guest-host displays is between about 0.5 and 2 percent by weight of the bulk nematic liquid crystal material.

Helichromic compounds are useful in guest-host displays not only to provide a dichroic dye moiety which will absorb one polarization of light but are simultaneously useful in these displays to eliminate the well known problem of "optical bounce" or "reverse twist" without the use of the optically active dopants utilized in guest-host displays of the prior art. "Optical bounce" is a hydrodynamic effect which hinders the ability of the display to return precisely to the relaxed (no image produced) state, when the voltage across the display is terminated. This phenomenon is discussed in Ann. Phys., 19, 273 (1972).

The helichromic dyes of the present invention may also be utilized in traditional twist nematic liquid crystal displays to eliminate "optical bounce" and thus reduce the decay time of the device. The construction and operation of twist nematic type displays is well documented in the art, e.g. U.S. Pat. No. 3,918,796. These devices alternate between transmission of light and no transmission of light depending upon whether a voltage is applied across the cell.

The contents of a traditional twist nematic cell of the prior art comprises liquid crystalline material and optionally between ½ and 3% by weight of an optically-active additive which eliminates optical bounce and reduces decay time. The present invention contemplates the use of between about 0.1 and 1% by weight helichromic compound in order to reduce optical bounce and eliminate the need to utilize optically-active liquid crystalline additives.

The use of helichromic compounds to replace the optically-active dopants conventionally used in guest-host and twist nematic displays eliminates the problems associated with these additives as discussed hereinabove. In addition, the concentration of helichromic compound required to eliminate optical bounce is lower than when conventional optically-active liquid crystal additives are used, thus additionally reducing possible liquid crystal cell degradation.

The following examples illustrate compositions and devices in accordance with the invention. It should be understood that this is done solely by way of example and is intended neither to delineate the scope of the invention nor limit the ambit of the claims. Examples 1–19 describe intermediates useful in the preparation of the helichromic dyes, described in Examples 20–64. Examples 65–68 illustrate the use of helichromic compounds in liquid crystal displays. In the examples which follow and throughout the specification, the quantities of material are expressed in terms of percentages of weight of the total composition, unless otherwise specified.

EXAMPLE 1

The intermediate (+)-2-methylbutyl bromide was prepared by mixing (−)-2-methyl-1-butanol (300 gm 3.4 moles), with 100 ml. of pyridine. Over a period of 5 hours 513 gm (3.40 mole) of $PBr_3$ was added to the mixture. The temperature of the reaction mixture during the $PBr_3$ additions was maintained at 20°–25° C. The product was then distilled under reduced pressure to give 485 gm of crude (+)-2-methylbutyl bromide. The crude material was dissolved in 1 l. of petroleum ether (b.p. 30°–60° C.) and was washed in succession with first 5% NaOH, then water, then 10% $H_2SO_4$, then concentrated $H_2SO_4$ and finally water again. After drying over anhydrous calcium sulfate the petroleum ether was stripped off and the product was fractionated at atmospheric pressure. (+)-2-methylbutyl bromide (397 gm) was recovered (b.p. 119°–121° C.). Nuclear Magnetic Resonance (NMR) and Infrared (IR) spectra confirmed the proposed structure of the product. $[\alpha]_D^{20}=3.9°$.

EXAMPLE 2

The intermediate (+)-2-methylbutyl benzene was prepared by the procedure described hereinbelow.

(a) Preparation of the catalyst
[dichloro-1,2-bis—diphenyl-phosphino—ethane]nickel (II)

A solution of 1,2-bis(diphenylphosphino)ethane (4 gm), prepared according to the method of Tamao et al., J.A.C.S., 94, 4735 (1974), dissolved in 400 ml warm ethyl alcohol was added to 2.4 gm hydrated nickel chloride in 20 ml ethyl alcohol. The product crystallized as dull orange needles.

(b) Preparation of (+)-2-methylbutyl magnesium bromide

Magnesium turnings (38.3 gm) were placed in a dry 2 liter flask equipped with dropping funnel, nitrogen inlet, and stir bar. Dry nitrogen was led in and the magnesium turnings were subjected to stirring overnight.

(+)-2-methylbutyl bromide (5 gm), prepared according to the procedure of Example 1, in 125 ml dry ether was run into the flask followed by 221.7 gm (+)-2-methylbutyl bromide in 1 liter of ether which was dropped in at a rate sufficient to maintain the reaction. The Grignard reagent was refluxed for one hour after addition was completed.

(c) Preparation of (+)-2-methylbutyl benzene

To a mixture of the nickel catalyst prepared in step (a) (208 gm, 0.39 mmol), chlorobenzene (135 mmol) and ether (50 ml) was added (+)-2-methylbutyl magnesium bromide (60 mmol), prepared in step (b), in 50 ml ether. The mixture was kept at 0° C., with stirring, over 10 minutes. The resulting mixture was heated to reflux for 20 hr. The reactants were cooled to 20° C. and 10% hydrochloric acid was added to hydrolyze the mixture. Sodium chloride is added to saturate the aqueous layer and the water phase was extracted with 3–50 ml portions of ether. The combined extracts are washed with water, dried over calcium chloride, and concentrated in vacuo. The residue was distilled under reduced pressure and the product, which boiled at 91° C. (25 mm Hg), was collected. The structure of the product was confirmed by NMR.

EXAMPLE 3

Preparation of the intermediate
(+)-4-(2-methylbutyl)-nitrobenzene

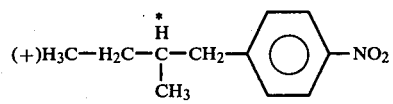

(+)-2-Methylbutylbenzene, prepared according to the procedure of Example 2, (0.75 mol, 111.0 gm) was added to 200 ml glacial acetic acid. This solution was added dropwise to a mixture of 420 ml 90% fuming nitric acid and 180 ml glacial acetic acid, which had been cooled at −20° C. Maintaining that temperature, the mixture was stirred for one hour and then poured into 2.5 l of ice water. The reaction products were extracted with 2-500 ml portions of petroleum ether (30°–60° C.) and the combined extracts were successively washed with water (2-100 ml portions); 5% sodium hydroxide (2-100 ml portions), 10% sodium hydroxide (2-100 ml portions); and water (3-100 ml portions). The extract was dried over anhydrous calcium sulfate, the solvent was removed under reduced pressure and the resultant light yellow oil fractionated under reduced pressure. The fraction boiling at 158°–160° C. (14 mm Hg) was collected, giving a 38% yield of the product. The structure was confirmed by NMR.

EXAMPLE 4

Preparation of the intermediate
(+)-p-(2-methylbutyl)-aniline

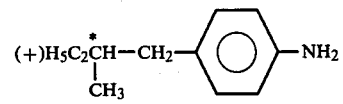

A mixture of (+)-4-(2-methylbutyl)-nitrobenzene, prepared according to the procedure of Example 3, (0.152 mol, 29.4 gm), 90 ml anhydrous ethyl alcohol, 3.05 gm activated carbon and 0.032 gm ferric chloride hexahydrate was refluxed for 10 minutes. Hydrazine hydrate (12.16 gm) was then added through a dropping funnel over a period of 15 minutes. Reflux was continued for 5 hours and the mixture was filtered while still hot. The solvent was removed under reduced pressure leaving 24.5 gm of amber liquid. This was then added to a mixture of 75 ml HCl and 150 ml water. The mixture was extracted using 200 ml ether. The aqueous phase was rendered strongly alkaline using sodium hydroxide pellets and the oily product was extracted with ether. The ether extracts were dried over sodium hydroxide pellets and the ether was evaporated. The resultant amine residue was then distilled and a 77% yield of (+)-p-(2-methylbutylaniline having a boiling point of 89°–90° C. (1 mm Hg) was recovered. Confirmational analysis (NMR and IR) verified the product. $[\alpha]_D^{20} = 11.8°$.

EXAMPLE 5

Preparation of the intermediate (+)-2-methylbutyl cyanide

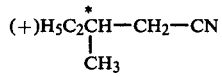

Sodium cyanide (0.1 mol, 15.1 gm) was dissolved in 50 ml dimethylsulfoxide and warmed to 60° C. (+)-2-methylbutyl bromide (15.1 gm), prepared according to the procedure of Example 1, was added dropwise while maintaining the temperature at 50°–60° C. The reaction mixture was then heated at 65° C. for 4 hours. Water (100 ml) was then added. The oily reaction product was extracted with ether and the combined ether extracts were washed with 6 N, HCl, water, and dried over anhydrous calcium sulfate. The ether was removed by evaporation and the residue was distilled giving a 61.7% yield of a colorless liquid boiling at 152°–153° C. Infrared analysis confirmed the product. A sharp CN peak was found at 4.6μ.

EXAMPLE 6

Preparation of the intermediate (+)-3-methyl-1-amino pentane

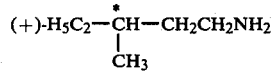

(+)-2-Methylbutyl cyanide, prepared according to the procedure of Example 5, (0.4 mol, 38.9 gm) was dissolved in 920 ml of n-butyl alcohol. Upon bringing the mixture to reflux, 64.4 gm (2.8 mol) of sodium (small pellets) was slowly added to the reaction mixture over 2 hours. After the sodium was added the mixture was refluxed for one hour, until no more metallic sodium was present. Upon cooling 600 ml of water was added and the amine was steam distilled. Concentrated HCl (40 ml) was added to the distillate. The butanol was removed by distillation and the remaining hydrochloride solution was concentrated to about 300 ml. Solid NaOH (125 gm) was added, the amine separated, and it was collected and dried over sodium hydroxide pellets, and then over sodium. Fractional distillation afforded 32.7 gm (80.7% yield) of the amine, boiling at 123°–124° C. An infrared spectrum showed a strong —NH₂ band in the 2.9–3.0μ region, confirming the structure of the product.

EXAMPLE 7

Preparation of the intermediate (+)-3-methyl pentanoic acid

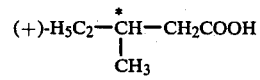

A Grignard reagent was prepared from (+)-2-methylbutyl bromide (0.5 mol, 75.6 gm), prepared according to the procedure of Example 1, magnesium (0.525 mol, 12.8 gm) and 450 ml ether. When the reaction was complete, the mixture was cooled to −10° C. and carbon dioxide was bubbled through in excess. The magnesium salt was hydrolyzed using 90 ml of concentrated H₂SO₄ in 160 ml water. The ether layer separated, the aqueous layer was extracted twice more, and the combined extracts were treated with 200 ml 25% NaOH. Acidification of the extracts produced an oil. The remaining aqueous layer was distilled, the distillate was saturated with sodium chloride, and the acid separated. The oily products were combined, dissolved in ether, and dried over anhydrous calcium sulfate. The ether was evaporated and the remaining oil was distilled giving a 57% yield of product which boils at 196°–198° C. Confirmation of the structure was made by NMR.

EXAMPLE 8

Preparation of the intermediate (+)-3-methyl pentanoyl chloride

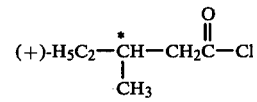

(+)-3-Methylpentanoic acid, prepared according to the procedure of Example 7, (0.258 mol, 30 gm) was added slowly to 36.4 gm (0.306 mol) gently refluxing thionyl chloride, over a period of 1 hour. Reflux was terminated after two additional hours. The product was distilled, b.p. 135°–139° C., giving 34.1 gm. Redistillation using a fractionating column gave 24 gm (70%) of product boiling at 140°–141° C. Confirmation of structure was made by NMR.

EXAMPLE 9

Preparation of the intermediate (+)-4-Methyl hexanoic acid (+)-4-Methylhexanoic acid was prepared from (+)-2-methylbutyl bromide, prepared according to the procedure of Example 1, using the method of Vogler and Chopart-dit-Jean, *Helv. Chim. Acta.*, 43, 279 (1960). The required boiling point of the product is 134° at 25 mm Hg; $[\alpha]_D^{20} = 9.4°$.

EXAMPLE 10

Preparation of the intermediate (+)-4-methyl hexan-1-ol (+)-4-Methylhexan-1-ol was prepared from the methyl ester of (+)-4-methylhexanoic acid using lithium aluminum hydride according to the procedure of A. I. Vogel, *Practical Organic Chemistry*, Longman LTD, London Ed3 (1970). The boiling point of the product was 180° C. at 20 mm Hg. The structure of the product was confirmed by NMR. $[\alpha]_D^{20}=7.6°$.

EXAMPLE 11

Preparation of the intermediate (+)4-(2-methyl butyl)-benzaldehyde

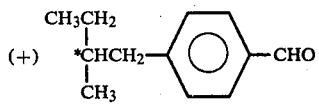

Trifluoroacetic acid (150 cc) was added to a flask containing 14.0 gm hexamethylenetetramine (HMTA). (+)2-methylbutylbenzene (14.8 gm) was then added and the mixture was refluxed for 21 hours. The deep orange mixture was distilled to remove excess trifluoroacetic acid. When about one third the volume remained, the mixture was poured into 600 ml ice water and stirred for 15 minutes. Sodium carbonate was added with stirring until the mixture was basic and the product was extracted with ether. The ether extract was washed with water and dried over sodium sulfate. The ether was removed leaving 18 gm crude (+)-4-2—methyl-butyl)benzaldehyde. This was vacuum distilled (78° C. at 0.07 mm Hg). The structure of the product was confirmed by NMR. The yield of the product was 78%.

EXAMPLE 12

Preparation of the intermediate (+)-4—2methyl butyl)-4'-nitrosobenzene

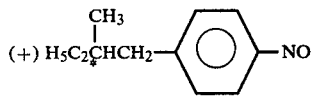

Caros acid was prepared by cautiously dissolving finely powdered ammonium persulfate (12 gm) in 17 gm of ice-cold sulfuric acid. The persulfate was added gradually while stirring. The mixture was poured onto 70 gm crushed ice and stirred. 1.7 gm of (+)-4-(-2methylbutyl)aniline was then added. After 12 hours the mixture was diluted and the precipitate of (+)4-(2-methyl-butyl)-nitroso-benzene was collected by separation from the reaction mixture.

Condensation of the nitroso compound with an equivalent of an aryl amine is effected by dissolving both components in a minimum quantity of glacial acetic acid and letting them react overnight to produce the azo compound.

EXAMPLE 13

The intermediate (+)-N-2-methylbutyl-naphthyla-mine was prepared by the procedure described below.

(a) Preparation of the secondary triflamide of α-amino naphthalene

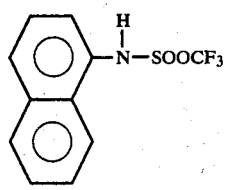

According to the method disclosed by Hendrickson et al. in "Tetra.lett," 39,3839 (1973), 1 mole of α-naphthylamine (1429 g) was dissolved in 750 ml dichloromethane and cooled to 0° C. Trifluoromethanesulfonic anhydride was then added dropwise, not allowing the temperature of the reaction mixture to rise above 15° C. at any time during the addition. When the addition was complete, the reaction mixture was allowed to warm to 20° C. and was then poured into 4 liters of ice water with rapid agitation. The organic phase was allowed to separate from the water phase and as much of the water layer as was possible was decanted. The remaining organic layer was extracted with three 500 ml portions diethylether. The drying agent was removed from the diethylether extracts by filtration and the diethylether was removed using a rotary evaporator. A 78% yield of trifluoromethanesulfonamido-α-naphthalene (300 gm) was recovered.

The above product was dissolved in 3 liters boiling carbon tetrachloride and 200 gm activated carbon was added. The mixture was immediately filtered while hot, and colorless platelets of pure triflamide of α-aminonaphthalene were recovered by filtration. The product was dried in an oven overnight. Pure triflamide of α-aminonaphthalene having a melting point of 112.9° C. was recovered in an 80% yield. The structure of the product was confirmed by IR, NMR and mass spectroscopy.

(b) Preparation of the sodium salt of trifluoromethanesulfonamido naphthalene

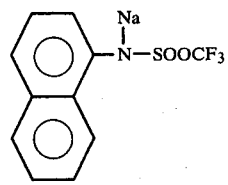

Sodium metal (4.91 gm) was dissolved in 200 ml absolute anhydrous ethanol and 58.7 gm of the triflamide of α-amino napthalene prepared in step (a) was added. The compound dissolved immediately and the mixture was refluxed, for 30 minutes. The flask containing the reaction mixture was then fitted with a Dean-Stark water collector and an addition funnel. The volume of solvent ethanol was reduced by approximately 50% and the reflux temperature was recorded at 74° C. 200 ml benzene was added and the reflux temperature dropped to 64° C. The azeotrope was selectively removed from the trap and when the remaining volume in the flask was about 100 ml, 200 more mls of benzene was added. The salt began to crystallize in the reflux when the reflux temperature was about 80° C. indicating removal of ethanol and water. The flask was removed from the trap and the remaining benzene was removed by a rotary evaporator yielding 63 gm of the sodium salt of trifluormethanesulfonamido naphthalene in a 99.2% yield. The structure of the product was confirmed by an IR spectra.

(c) Preparation of (+)-N-(2-methylbutyl)-N-trifluoromethylsulfonyl-α-naphthylamine

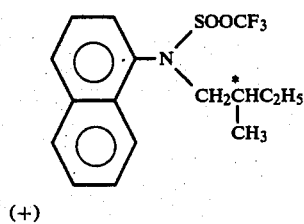

(+)

62.91 gm of the product obtained in step (b), 45 gm potassium iodide and 45 gm (+)-2-methylbutylbromide, prepared according to the procedure of Example 1, were dissolved into 500 ml dimethylformamide and refluxed 66 hours. The reaction mixture, containing precipitated KBr, was drowned in 1 liter water and extracted with 500 ml chloroform. The chloroform solution was dried using magnesium sulfate and the chloroform was removed using the rotary evaporator. The oily product remaining is vacuum distilled at 1 mm of mercury. The product collected at 150°-180° C. was the desired product (+)-N-(2-methylbutyl)-N-trifluoromethylsulfonyl-α-naphthylamine.

(d) Hydrolysis of (+)-N-(2-methylbutyl)-N-trifluoromethylsulfonyl-α-naphthylamine to yield (+)-N-(-2-methylbutyl)-α-naphthylamine

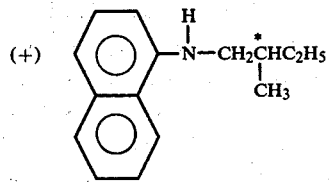

The drying agent calcium hydride (10 gm) was allowed to stand overnight in 1 liter of diglyme. The dried diglyme was decanted into a flamed out distilling flask and lithium aluminum hydride was added in small portions until no further effervesence occurred upon addition. The diglyme was then distilled at 15 mm, bp 62°-3° C., making sure only 500-600 ml were distilled into the receiving flask. This diglyme was stored over dry N₂.

A 500 ml round bottom flask fitted with a condenser, mechanical stirrer, and addition funnel fitted with drying tubes, was flame dried and charged with 400 ml of the dry diglyme. 180 ml 1 M lithium aluminum hydride in diethylether was poured into the addition funnel and slowly added to the diglyme. A white precipitate formed which redissolved upon warming the mixture. The mixture was then heated and the diethylether removed from the diglyme. The temperature of the diglyme/lithium aluminum hydride solution was kept at 105° C.

1.5 gm of the product of step (c) was dissolved in 100 ml of the dry diglyme and placed into the addition funnel. This solution was then slowly dropped into the hydride solution and when the addition was complete the funnel was removed, the thermometer added, and the temperature raised to a constant 110° C. The reaction was allowed to proceed for 16 hours and the resultant cloudy yellow mixture was allowed to cool to 20° C.

The reaction mixture was transferred to a large 1 liter dropping funnel and slowly dropped into 1 liter of water with constant stirring. The mixture was diluted to 6 liters with water and one liter at a time was extracted with 500 ml portions of diethylether. In each extraction 100 ml of a 25% by weight NaOH in water solution was added during the extraction. The combined ether extracts were washed twice with 1 liter water and were dried with magnesium sulfate.

The ether was removed by vacuum evaporation and the remaining oil was distilled from NaOH pellets at reduced pressure. The fraction boiling over at 0.7 to 1.0 mm, 144°-153° C., was the desired product in 80% yield. The structure of the product was confirmed by IR and NMR.

EXAMPLE 14

Preparation of the intermediate (+)-N-citronellyl-α-naphthylamine

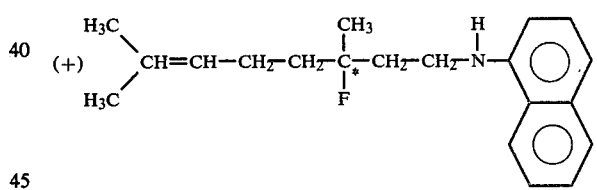

was prepared according to the procedure disclosed by Borsch et al. in J.A.C.S., 93, 2897 (1971).

2.0 g α-naphthylamine (14 mmol) and 0.01 gm α-naphthylamine-HCl were added to 25 ml absolute methanol along with 2.15 gm citronellal (14 mmol) and stirred for five minutes, after which the solution turned hazy. Then 0.53 gm (8.4 mmol) sodium cyanoborohydride was added and a brief exotherm occurred. The mixture was stirred overnight at room temperature. The bottom organic layer was separated from the top aqueous layer. An IR spectra of the organic layer (a brown oil) showed no carbonyl group and very little absorption in the OH/NH region (330-360 nm). Upon vacuum distillation of the organic layer the component having a bp of 175°-180° C. was collected. The desired product was recovered as a pale yellow oil in 21% yield. The structure of the amine product was confirmed by NMR.

EXAMPLE 15

Preparation of the intermediate
(+)-N-camphanyl-α-naphthylamine

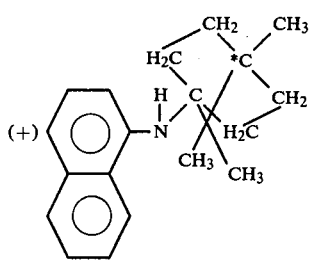

Camphor (10 gm), 9.4 gm α-naphthylamine, 0.1 gm α-naphthylamine-HCl and 30 gm 1 Å molecular sieves were added to 40 ml anhydrous methanol. Sodium cyanoborohydride (2.5 gm) was added dropwise and stirred under $N_2$ for 48 hours. The sieves were removed by filtration and 5 drops of concentrated HCl were added to the filtrate until it was acidic (pH>7). The solvent was stripped by boiling and 10 gm potassium hydroxide was added to the remaining mixture. The aqueous phase was extracted with ether over potassium carbonate. The extractions were filtered to remove the potassium carbonate. After the ether was evaporated, the mixture was distilled under high vacuum. The material boiling at 120° C. and 0.1 mm of mercury was collected. IR spectra verified that this material was the product.

EXAMPLE 16

Preparation of the intermediate
(+)-N-(3-methylcyclohexyl)-α-naphthylamine

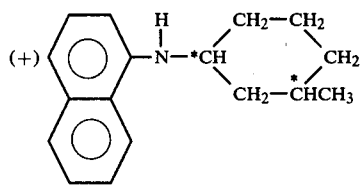

The procedure described in Example 15 was repeated except that the 10 gm of camphor was replaced by 7.4 gm of 3-methylcyclohexanone. The material boiling at 145°–160° C. and 0.1 mm of mercury was collected. IR spectra verified that this material was (+)-N-(3-methylcyclohexyl)-α-naphthylamine.

EXAMPLE 17

Preparation of the intermediate
(+)-4-methylhexylaniline

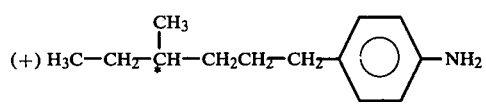

Using the procedure of Example 1, (+)-4-methylhexan-1-ol, prepared according to Example 10, is converted to the corresponding optically-active bromide. Then, according to the procedure of Example 2, the optically-active bromide is converted to (+)-4-methylhexylbenzene. Then, following the procedures described in Examples 3 and 4, the (+)-4-methylhexylbenzene is nitrated and reduced to (+)-4-methylhexyl aniline. The structure of the product is confirmed by NMR.

EXAMPLE 18

Preparation of the intermediate
(+)-p-(2-methylbutyl)phenylazo-[2,5]-dimethylphenylazo-[2,5]-dimethylaniline

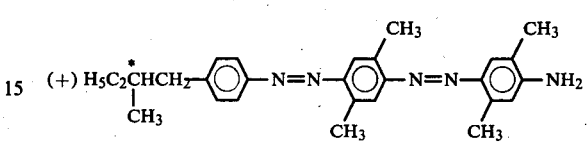

(+)-p-(2-methylbutyl)aniline (16.1 gm), prepared according to Example 4, was dissolved in 100 ml concentrated hydrochloric acid and 50 ml of water was added to disperse the acid salt. The slurry was cooled to 0° C. and diazotized by adding dropwise 6.9 gm $NaNO_2$ in 30 ml water. After the completion of diazotization, as indicated by starch-iodide paper, the clear diazonium is added to a mixture of 12.1 gm 2,5-dimethylaniline in 100 ml glacial acetic acid. Coupling occurred and a saturated sodium acetate solution was added to adjust the pH to 5.0. The bright red product was collected by filtration and redispersed in 50 ml water. A solution of 20% by weight sodium carbonate in water was added until the pH was greater than 7. The product was filtered, washed and dried to yield (+)-p-(2-methylbutyl)phenylazo-[2,5]-dimethylaniline in 85% yield.

The above product (28 gm) was dissolved in 100 ml 87% sulfuric acid in water and diazotized by the dropwise addition of nitrosylsulfuric acid at 10° C. until diazo formation was complete. To this solution was added 12 gm 2,5-dimethylaniline dissolved in 25 ml glacial acetic acid. After coupling was complete the mixture was diluted with ice water and neutralized using a 20% by weight sodium hydroxide solution. The helichromic intermediate was recovered by filtration in a 60% yield. The structure of the helichromic intermediate was confirmed by NMR.

EXAMPLE 19

Preparation of the intermediate
(+)-p-(2-methylbutyl)phenylazo-(phenylazo)aniline

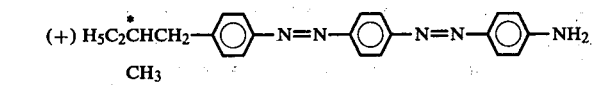

This intermediate was prepared according to the procedure of Example 18 by substituting aniline for the 2,5-dimethylaniline.

Preparation of Helichromic Compounds

EXAMPLE 20

Helichromic (+)-1-[4-(-2-methylbutyl)phenylazo](2-hydroxy)naphthalene

EXAMPLE 22

Helichromic (+)-4,4'-bis[4-(2-methylbutyl)phenylazo)2,3-dihydroxy naphthalene

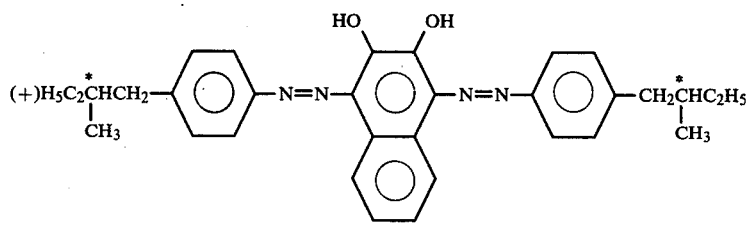

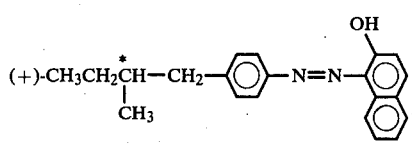

(+)-4-(-2-methylbutyl)aniline prepared according to the procedure of Example 4, (0.012 mol, 2.0 gm) was dissolved in 5 ml concentrated hydrochloric acid and 5 ml water. Upon cooling to 0° C., sodium nitrite (0.015 mol, 0.85 gm) was added slowly while maintaining the temperature at 0°–5° C. When the amine was completely diazotized (a negative reading on starch-iodide paper), coupling was effected by slowly adding the cold diazonium solution to an ice cold solution of 2-naphthol (0.012 mol, 1.72 gm) dissolved in 10 ml 10% NaOH. Immediately an orange precipitate of the azo formed. After 30 minutes the precipitate was filtered, washed with water, vacuum dried and recrystallized from 50 ml of methyl alcohol. The orange colored needles melted at 74°–75° C. $\lambda_{max}^{CHCl_3}=490$ nm. Elemental analysis confirmed the structure of the product.

EXAMPLE 21

Helichromic (+)-4-[-4-(-2-methylbutyl)phenylazo-]-N,N-dimethylaniline

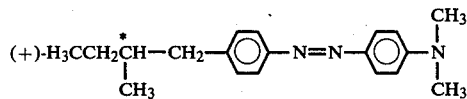

(+)-4—2-methylbutyl)aniline, prepared according to the procedure of Example 4, (0.1 mol, 1.61 gm) was diazotized in 20 ml of 20% hydrochloric acid using 0.69 gm sodium nitrite, as in Example 20. N,N'-dimethylaminobenzene was dissolved in 20% hydrochloric acid (1.35 gm in 25 ml) and cooled to 0° C. The diazonium solution was then added and stirred 1½ hours. Aqueous 20% sodium acetate (50 ml) was then added. After 20 hours at 10° C. the mixture was warmed to room temperature and a purple solid was filtered, washed with water and dried. The product, upon recrystallization from methyl alcohol gave orange crystals melting at 64°–65° C. The structure of the product was confirmed by NMR, and I.R.

was prepared by diazotizing 1.61 g. (0.1 mol) of (+)-4-(2-methylbutyl)aniline (prepared according to the procedure of Example 4) in 20 ml of 20% hydrochloric acid with 0.69 gm of sodium nitrite, as in Examples 20 and 21. The diazotization product was coupled with 1 equivalent (1.61 gm) of 2,3-dihydroxynaphthalene dissolved in 20 ml of 20% sodium hydroxide. The mixture was neutralized (pH 7) with acetic acid and the precipitate was collected by filtration. The precipitate (3.28 gm) was dissolved in 20 ml of 20% NaOH. An additional equivalent of (+)-4-(2-methylbutyl)aniline in 20 ml of 20% HCl was diazotized using 0.69 gm of sodium nitrite. The second diazotization product was added to the first. 20% aqueous sodium acetate (50 ml) was added to the mixture and it was maintained at 10° C. overnight. The precipitate was collected by filtration, recrystallized once from toluene, and isolated by column chromatography employing silica gel. Toluene was used as the eluent to separate the mono-substituted product, and toluene/CHCl₃ was used to separate the bis-substituted product. The bis-substituted product was recrystallized from toluene in the form of dark purple crystals having a melting point of 245°–246° C. Elemental, NMR and IR analysis confirmed the structure of the product.

EXAMPLE 23

Helichromic (+)-1-methylamino-4-[4-(2-methylbutyl)anilino]anthraquinone

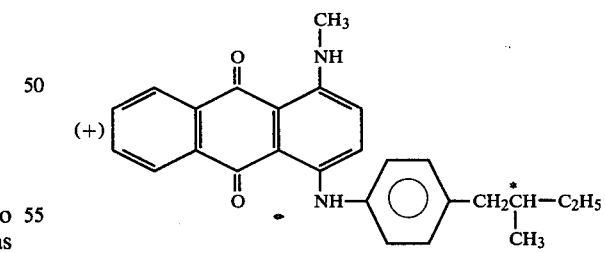

was prepared by mixing 2.0 gm (0.0063 mol) of 1-methylamino-4-bromo-anthraquinone, 2.51 gm (0.0063 mol) of (+)-4-(2-methylbutyl)aniline (prepared according to the procedure of Example 4), 2.6 gm of potassium acetate and 0.05 gm of hydrated copper acetate in 10 ml of nitrobenzene and heating under nitrogen at 160°–170° C. for a period of about 8 hours. Nearly all the nitrobenzene was then distilled off under vacuum in an oil bath heated to 125° C. After cooling to room temperature 100 ml of toluene was added to dissolve the colored product and the insoluble material was filtered off. The toluene filtrate was then chromatographed on silica gel using toluene as an eluent. Fractions containing the deep blue product were combined, stripped of solvent, and the residue was crystallized from ethanol giving 1.5 gm dark purple iridescent crystals, m.p. 95°–7° C. $\lambda_{max}^{CHCl_3}$ of 647 and 603 nm and NMR and IR analysis confirmed that the product obtained was (+)-1-methylamino-4-[4-(2-methylbutyl)anilino]anthraquinone.

EXAMPLE 24

Helichromic (+)-1,5-bis(3-methylpentyl amino) anthraquinone

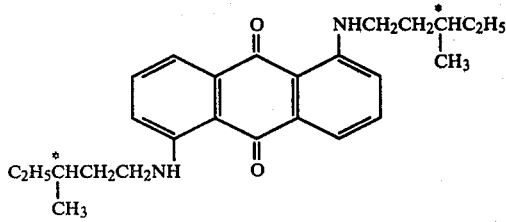

was prepared by mixing 2.0 gm (0.0072 mol) of 1,5-dichloroanthraquinone, 10.1 g (0.1 mol) of (+)-3-methyl-1-aminopentane (prepared according to the procedure of Example 6) and 0.05 gm of copper powder and refluxing for 4 hours. After cooling to room temperature 50 ml of methanol was added, and the mixture was stirred for a short while. Dark red iridescent crystals (2.7 gm) were filtered off, washed with methanol and vacuum dried. One recrystallization from ethanol gave dark red iridescent plates having a m.p. of 103°–4° C. Elemental, NMR, and IR analysis confirmed the structure of the product.

EXAMPLE 25

Helichromic (+)-1-(3-methylpentylamino)anthraquinone

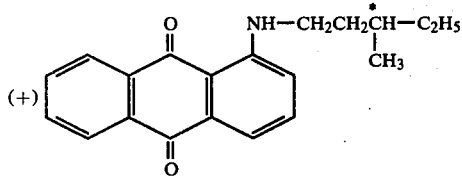

was prepared by combining 2.10 gm (0.1 mol) 1-chloroanthraquinone with 9.8 gm of (+)-3-methyl-1-amino pentane (as prepared by the procedure of Example 6) and 0.05 gm of copper powder and refluxing the mixture for 4 hours. After cooling to room temperature, 50 ml of methanol were added and the mixture was stirred for a short while. Red crystals were filtered off, washed with methanol and vacuum dried. Two recrystallizations from hexane gave red iridescent crystals having a melting point of 56°–7° C. An infrared spectrum confirmed that the crystals were (+)-1-(3-methylpentylamino) anthraquinone.

EXAMPLE 26

Helichromic (+)-1-[4-(2-methylbutyl)anilino]anthraquinone

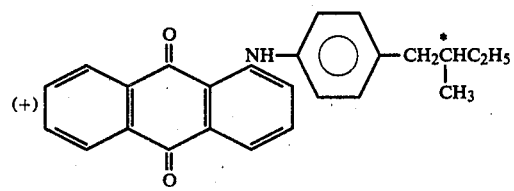

was prepared by mixing 1-chloroanthraquinone (4.85 gm 0.02 mol), (+)-4-(2-methylbutyl)aniline (6.5 gm 0.04 mol), (prepared by the procedure of Example 4) 7.8 gm of potassium acetate, 0.10 gm of copper acetate hydrate and 25 ml of nitrobenzene and heating the mixture at about 185° C. under a stream of nitrogen for 5 hours. The nitrobenzene was removed under reduced pressure and the residue was vigorously stirred for 30 minutes with 250 ml of petroleum ether. A solid was removed by filtration, washed with water, then washed with methanol and dried in a vacuum oven. Toluene (40 ml) was added to the dried solid and the insoluble material was removed by filtration. The filtrate was chromatographed on silica gel using toluene as an eluent. The red dye product had a m.p. of 85°–86° C. and $\lambda_{max}^{CHCl_3} = 514_{nm}$. Elemental, NMR and IR analysis confirmed that the product was (+)-1-[4-(2-methylbutyl)anilino]anthraquinone.

EXAMPLE 27

Helichromic (+)-1,5-bis-[4-(2-methylbutyl)-anilino]anthraquinone

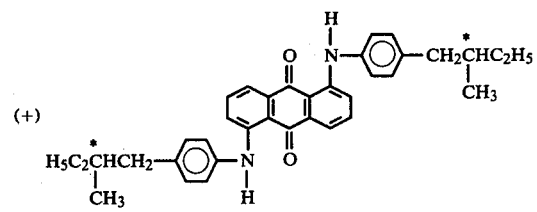

was prepared by mixing 2.77 gm (0.01 mol) 1,5-dichloroanthraquinone with 3.4 gm (0.02 mol) (+)-4-(2-methylbutyl)aniline (prepared according to the procedure of Example 4), 25 ml of nitrobenzene, 0.1 gm copper acetate hydrate and 5 gm potassium acetate, and heating the mixture at 185° C. for 4 hours. The reaction mixture was cooled to room temperature and poured into 600 ml of methanol. The resultant solid product was filtered, recrystallized once from hexanes and chromatographed on silica gel with toluene as an eluent. The red product produced had $\lambda_{max}^{CHCl_3} = 544_{nm}$. NMR and IR analysis confirmed that the product was (+)-1,5-di-[4-(2-methylbutyl)anilino]anthraquinone.

EXAMPLE 28

Helichromic (+)
1-[-4-(2-methylbutyl)-anilino-]-4-hydroxyanthraquinone

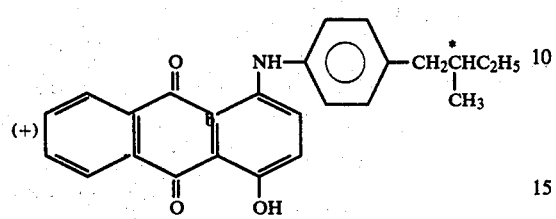

was prepared by adding 25.8 gm (0.1 mol) of 1-chloro-4-hydroxyanthraquinone (prepared according to the procedure of F. Ullman, Berichte 55:826 and 832 (1920)) to 16.3 gm (0.1 mol) of (+)-4-(2-methylbutyl)aniline (prepared according to the procedure of Example 4), 25 ml of nitrobenzene, 0.1 gm copper acetate and 5 gm potassium acetate and heating the mixture at 185° C. for 4 hours. The reaction mixture was cooled to room temperature and poured into 600 ml of methanol. The resultant solid product was filtered, recrystallized once from hexanes and chromatographed on silica gel with toluene as an eluent. The blue product produced had a m.p. of 98°-101° C., and $\lambda_{max}^{CHCl_3} = 587_{nm}$. NMR, IR and elemental analysis confirmed the product.

EXAMPLE 29

Helichromic
(+)-1-(2-methylbutamido)-4-aminoanthraquinone

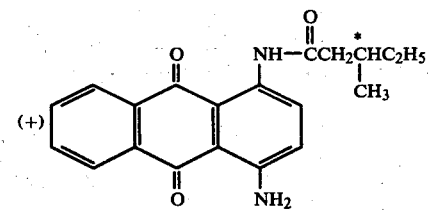

was prepared by dissolving 4.43 gm (0.0185 mol) 1,4-diaminoanthraquinone in 125 ml of nitrobenzene. (+)-3-methylpentanoyl chloride (5 gm 0.037 ml) prepared according to the procedure of Example 8 was then added to the solution. The mixture was heated at 100° C. for 3 hours followed by heating at 140° C. for 3½ hours. After cooling to room temperature a greenish brown solid was filtered off, washed with hexanes and then washed with warm water. After vacuum drying the solid weighed 3.1 g.m The solid was dissolved in toluene and filtered. The filtrate was chromatographed on neutral alumina (activity II) with toluene containing 10% acetone as the eluent. After recrystallizing from toluene, dark red-purple crystals were obtained, m.p. 155°-157° C. Elemental and IR analysis confirmed the structure of the product.

EXAMPLE 30

Helichromic (+)-B
1,4-bis(2-methylbutylcarbonyloxyethamido)anthraquinone

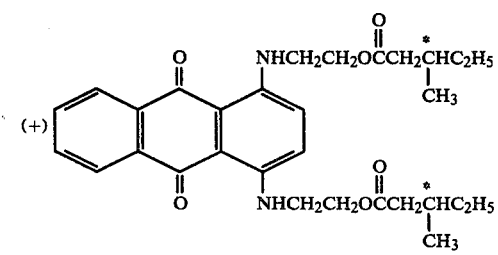

and helichromic
(+)-1-(2-methylbutylcarbonyloxyethamido)anthraquinone

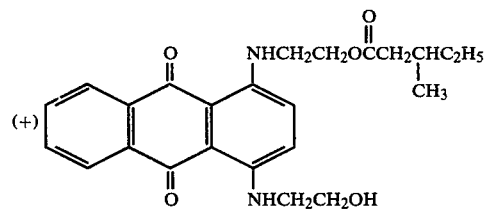

were prepared by dissolving 1,4-bis-(2-hydroxyethylamino)anthraquinone (5.04 gm 0.015 mol) in 150 ml of pyridine at 40° C. and then adding 4.03 gm (0.03 mol) of (+)-3-methylpentanoyl chloride (prepared according to the procedure of Example 8). The reaction mixture was heated and stirred for 2 hours at 70° C., cooled, poured into about 4 l of water and acidifided (pH 5) with hydrochloric acid. A sticky dark blue solid formed and was filtered off. The solid was dissolved in 400 ml of chloroform and the solution was washed with water, dried and, after removing the solvent under reduced pressure, 5.8 gm of dark blue solid remained. This solid was recrystallized from methanol giving 2.4 gm of purple iridescent needles which were shown by an NMR spectrum to be mainly the dichiral-substituted product. The filtrate from which the blue solid was initially collected was concentrated and another 2.0 gm of purple iridescent crystals were obtained.

The 2.4 gm lot and the 2.0 gm lot of crystals were combined and chromatographed on activity II neutral alumina, with toluene containing 10% acetone as an eluent. The first fractions contained the di-chiral-substituted product which crystallized from methanol as purple iridescent needles, m.p. 94° C. Later fractions eluted with 1:1 toluene/acetone eluent contained the mono-chiral-substituted product which crystallized from an 4:1 hexane/methanol mixture as purple iridescent crystals. Elemental, NMR and IR analysis confirmed the structures of these products.

EXAMPLE 31

Helichromic 4-(N,N'-dimethylaminobenzylidene)-4'-(2-methylbutyl)-aniline

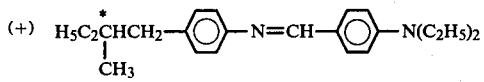

was prepared by mixing 3.26 gm (0.02 mol) (+)-4-(2-methyl-butyl)aniline (prepared according to the procedure of Example 4) 3.55 gm (0.02 mol) p-N,N'-diethyl-aminobenzaldehyde and 6 gm of "Linde" molecular seive 3 A (available from the Linde Corp., N.Y., N.Y.) in 20 ml of methanol and refluxing the mixture under a nitrogen blanket for 1½ hours. The sieves were then filtered off, washed with methanol and stripped of solvent on a rotary evaporator under reduced pressure, leaving a viscous yellow oil. This oil was vacuum distilled twice, b.p. 221°-3° C./0.3 mm, giving a yellow oil which solidified upon cooling. NMR and IR spectra confirmed the structure of the product.

EXAMPLE 32

Helichromic (+)-1,4-Bis[4-(2-methylbutyl)phenylazo]benzene

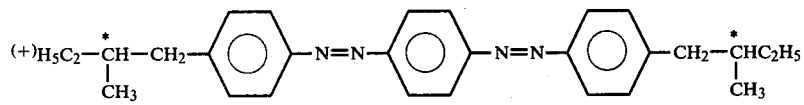

One molecular equivalent of (+)-4-(-2-methylbutyl)aniline was diazotized, at 0° C. in mineral acid using sodium nitrite, and coupled to one equivalent of 4-amino-4'-nitrobenzene in acetic acid. Recovery of this intermediate, reduction of the nitro group to the amino function using sodium sufide/ethanol, conversion to the nitroso compound via Caras Acid, ammonium persulfate-sulfuric acid (Organic Synthetic Chemistry, Vol. II, p. 310 (1956)), and subsequent coupling of the nitroso derivative in glacial acetic acid with one equivalent +-4-(-2-methylbutyl)-aniline, afforded upon recovery, and recrystallization from ethanol the pure helichromic dye. The structure of the product was confirmed by IR and NMR.

EXAMPLE 33

Helichromic (+)-1,5-bis-[-4-(2-methylbutyl)-phenylthio]anthraquinone

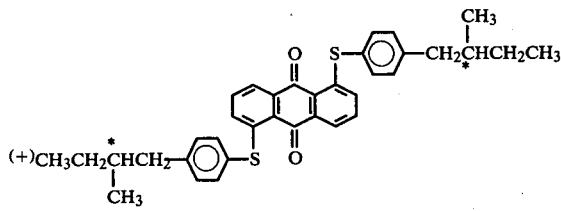

1,5-dichloroanthraquinone (2.77 gm) was dissolved in 25 ml dimethylformamide and heated to 60° C. Anhydrous potassium carbonate (10.0 gm) and 3.5 gm (0.02 ml) (+)-4-(2-methylbutyl)-4-mercaptobenzene were added. The mixture was stirred at 140° C. for 40 minutes and then allowed to cool after filtering the remaining potassium carbonate from the hot dimethylformamide solution. Ethyl alcohol (20 ml) was added and the bright yellow helichromic product was recovered by filtration, washed with methyl alcohol and chromatographed using Activity II Alumina and dichloromethane as eluent. The structure of the product was confirmed by NMR.

EXAMPLE 34

(+)-2-[4-(2-methylbutyl)phenylazo]-5-nitrothiazole

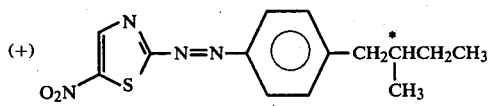

One equivalent of 5-nitro-2-nitroso-thiazole was dissolved in a minimum quantity of glacial acetic acid and one equivalent of (+)-4-(2-methylbutyl)aniline (ex. 4) was added. The solution was allowed to react overnight and the resultant coupled helichromic dye was recovered by precipitation with water. Chromatography on alumina afforded the pure dye compound.

EXAMPLE 35

Helichromic (+)-2-[-4-(-2-methylbutyl)phenylazo-]-5-(4-N,N'-diethylphenylazo—1,4-dimethyl benzene (+)-4-(2-methylbutyl)aniline, prepared according to the procedure of Example 4, (0.01 mol, 1.64 gm) was dissolved in 20 ml of concentrated hydrochloric acid and 20 ml H₂O was added. After diazotization in the usual manner using sodium nitrite and keeping the diazonium solution at 0° C., it was stirred into 1.2 gm (0.01 mol) 2,5-dimethylaniline in 20 ml acetic acid.

Upon the completion of coupling the solution was neutralized with 20% sodium hydroxide. The intermediate (+) phenylazo derivative was recovered by filtration.

A second diazotization was performed on the optically-active intermediate using the above procedure and subsequent coupling with one equivalent N,N'-diethylaminobenzene in acid media. Neutralization and separation by vacuum filtration resulted in recovery of the desired helichromic compound. The structure of the product was confirmed by NMR.

EXAMPLE 36

Helichromic
(+)-1-[4-(+2-methylbutyl)phenylazo-]4-(4-N,N'-dimethylphenylazo)-2-hydroxynaphthalene

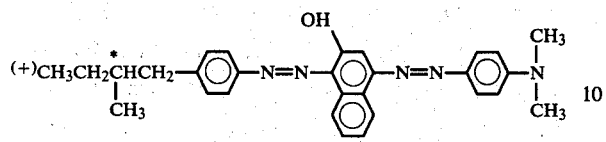

(+)-4-(2-methylbutyl)aniline, prepared according to the procedure of Example 4, (0.01 mol, 1.6 gm) was dissolved in 20 ml concentrated hydrochloric acid and 20 ml water was added. The solution was cooled to 0° C. and diazotization was accomplished using 0.69 gm sodium nitrite. The clear diazonium solution was stirred into 1.6 gm 1-amino-3-hydroxynaphthalene in 20 ml acetic acid kept at 0° C. After 90 minutes the solution was neutralized using 20% sodium hydroxide and the resulting azo intermediate was recovered by filtration.

A second diazotization was performed on the above intermediate using the same procedure and the diazonium solution was coupled to one equivalent N,N'-dimethylaminobenzene. Recovery by neutralization, filtration and recrystallization from toluene afforded the desired helichromic compound.

EXAMPLE 37

(+)Bis(1,1'-(2-methylbutyl)phenylazo)[-4,4'-azonaphthyl)azophenyl]azobenzene

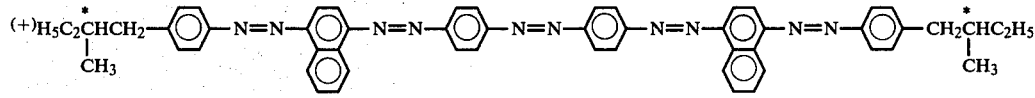

Azodianiline (0.1 mol, 2.1 gm) was tetrazotized using 2 equivalents (1.4 gm) sodium nitrite in 20 ml concentrated hydrochloric acid at 0° C. Two equivalents 1-naphthylamine were dissolved in 40 ml 1:1 glacial acetic/formic acid and cooled to 0° C. to produce a coupling solution. The clear tetrazonium solution was stirred into the coupling solution and the mixture was stirred 90 minutes at 0°–5° C. The bis-naphthyl intermediate was recovered and converted to the bis-nitroso derivative using Caro's acid. Two equivalents (3.2 gm) (+)-4-(2-methylbutyl)aniline, prepared according to Example 4, were coupled by stirring the bis-nitroso derivative into the chiral aniline in glacial acetic acid at 0° C. Upon completion of coupling the solution was neutralized using sodium carbonate and the precipitated helichromic compound was recovered by vacuum filtration. The helichromic dye was purified by chromatography on silica gel using methylene chloride.

EXAMPLE 38

(+)-1-(2-methylbutyl methylamino)-4-(4-N-ethylamino)phenylazo naphthalene

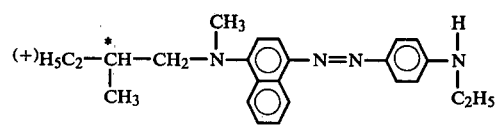

The intermediate (+)-1-(2-methylbutylmethylamino)4-nitronaphthalene was made via the method of Morgan, G. T.; Micklethwait, F. G. M., J., 91 1516 (1907). (+)-1-(2-methylbutylamino)4-nitronaphthalene was converted to (+)-1-(2-methylbutylamino-+-4-aminonaphthalene by lithium aluminum hydride reduction in tetrahydrofuran. (+)-(2-methylbutylamino)-4-aminoaphthalene (0.1 mol) was diazotized in 25 ml cold concentrated sulfuric acid (−10° C.) using nitrosylsulfuric acid (0.1 mol). N-ethylaminobenzene (0.1 mol) was dissolved in acetic acid and the diazonium solution was poured in along with 200 gm ice. Rapid stirring and subsequent agitation for 2 hours was followed by neutralization with 30% sodium hydroxide. The helichromic product was recovered by vacuum filtration.

Chromatography on silica gel using toluene eluent affords the pure product as brillant orange crystals.

EXAMPLE 39

(+)-4-(2-methylbutyl)-4'-(5-nitrothiazolylazo)-azobenzene

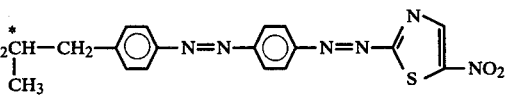

5-nitro-2-amino-thiazole was diazotized in mineral acid using sodium nitrite and coupled in the conventional manner with one equivalent aniline. Recovery of the free base of the monoazo dye and subsequent condensation of one equivalent of thin dye with one equivalent (+)-4(-2-methylbutyl)4'-nitrosobenzene in a minimum quantity of glacial acetic acid affords the helichromic dye upon recovery from the reaction mixture. Column chromatography on alumina using cloroform yields the pure dye.

EXAMPLE 40

Helichromic (+)-1,4,5-tri[4-(2-methylbutyl)phenylanilino]anthraquinone

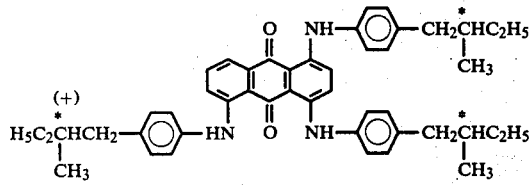

1,4,5-Trichloroanthraquinone (1.56 gm 0.005 mol) prepared by the method of A. Goldbergm J. C. S., 1791 (1931) was dissolved in 20 ml of hot nitrobenzene. Then 4.9 gm (0.03 mol) of (+)-4-(2-methylbutyl)aniline, 5.8 gm of potassium acetate and 0.1 gm of copper acetate were added. The mixture was then heated under nitrogen slowly to 200° C. and the course of the reaction was followed by thin layer chromatography (TLC) on silica gel with 1:1 toluene/hexane. When the mixture was predominantely the tri-substituted dye (TLC-cyan spot) heating was continued for another 15 minutes at 215° C. The mixture was then cooled. The reaction mixture was diluted with 250 ml of methanol and a dark blue viscous material separated. This was chromatographed twice using silica gel and 1:1 toluene/hexane as an elutant. The fractions containing the cyan dye were combined and stripped of solvent leaving a viscous residue. The viscous material was then heated under high vacuum to remove any solvent and on cooling, the dye solidified. TLC, NMR and IR analysis indicated this was the desired, essentially pure, tri-substituted dye.

EXAMPLE 41

Helichromic (+)-1,5-bis[4-(2-methylbutyl)phenylazo]-2,6-dihydroxynaphthalene

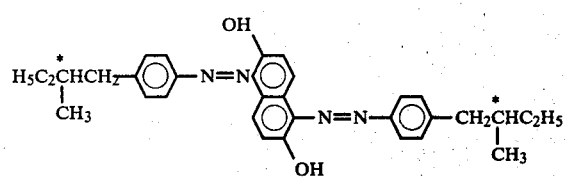

4.08 g (0.025 mol) of (+)-4-(2-methylbutyl)-aniline was diazotized in the usual manner, keeping the temperature at about 5° C. 2,6-dihydroxy naphthalene (2.55 gm; 0.013 mol) dissolved in 10 ml of water containing 1.86 gm (0.046 mol) of sodium hydroxide was then slowly added to the diazonium solution with good stirring and the temperature was kept at about 5°-10° C. Stirring was continued overnight at 10°-15° C. The reaction mixture was then neutralized with dilute hydrochloric acid and the dark maroon precipitate was filtered off, washed thoroughly with water and dried at 90° C. in a vacuum oven.

The reaction product was chromatographed on silica gel using toluene as an eluent and the fractions containing the reddish dye (purple spot on TLC plate) were combined and stripped of solvent, leaving a dark red powder. NMR and IR analysis indicated that this was essentially the desired disubstituted dye. $\lambda_{max}$ in phenylcyclohexane (PCH) was 525 nm.

EXAMPLE 42

Helichromic(+)-2-[4-(2-methylbutyl)benzylidene]-1-Ethyl-1,2-dihydroquinoline

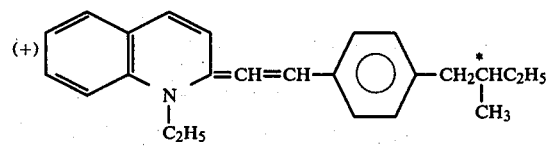

(+)-4-(2-methylbutyl)aniline can be converted to the correspoding(+)-4-(2-methylbutylfluorobenzene by the well-known Schiemann reaction. By refluxing a mixture of 0.1 mole of the fluorobenzene derivative and 0.1 mole of quinaldine ethyltosylate in 100 ml of acetonitrile and 0.2 mole of diisopropylethylamine for 5-6 hrs, the arylidene dye is formed. The dye can be isolated and purified by column chromatography.

EXAMPLE 43

Helichromic (+)-Bis-1,5-(α-methylbenzylamino)anthraquinone

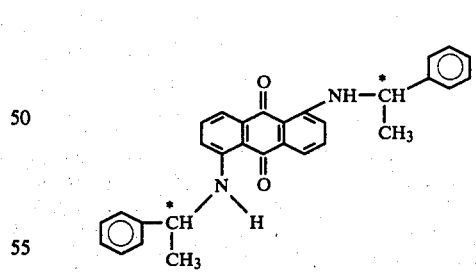

Five gm of 1,5-dichloroanthraquinone was combined with an excess (10 gm) of (+)-α-methylbenzylamine ($[\alpha]^{23} = +38°$) and heated at 150° C. for 4 hours. Column chromatography using silica gel and toluene as the eluent, and recrystallization 3 times from hexane yielded the pure desired product.

The pure product had a melting point of 134°-136° C. and its structure was confirmed by NMR.

EXAMPLE 44

Helichromic (+)
4-phenylazo-4'-[4-(3-methylcyclohexylamino)]naph-
thylazo azobenzene

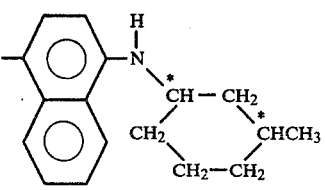

(+)

Phenylazo aniline (0.1 mol) was dissolved in 50 ml of a 20% HCl in water solution and cooled to 0° C. in an ice bath. This compound was diazotized using 0.1 mole of sodium nitrite in 20 ml of water, added dropwise. When diazotization was complete coupling was effected by stirring the product into 0.1 mole of (+)-N-(3-methylcyclohexyl)-α-naphthylamine, prepared according to the procedure of Example 16, in 50 ml of glacial acetic acid. After coupling had occurred the mixture was neutralized using a 20% by weight solution of NaOH in water, and filtered. The pure helichromic compound was recovered by chromatography on silica using 4:1 toluene/methanol as the eluent. IR and NMR confirmed the structure of the product ($\lambda_{max}$ in toluene (Tol) was 520 nm).

EXAMPLE 45

Helichromic (+)-Bis-(citronellyl)aminonaphthyl-azo dye

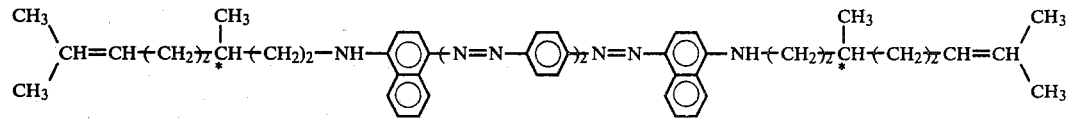

Two equivalents of the intermediate prepared in Example 14 were coupled to 1 equivalent of tetrazotized azodianiline per the procedure described in Example 37. The resulting blue helichromic dye was purified by chromatography on alumina using 4:1 toluene/methanol as the eluent. The structure of the product was confirmed by IR and NMR ($\lambda_{max}^{Tol} = 595$ nm).

EXAMPLE 46

Helichromic
(+)-1,4-diaminoanthraquinone-N-(2-methylbutyl)-2,3-dicarboximide

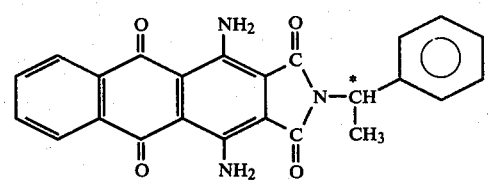

(a) Preparation of
1,4-diamino-2,3-anthraquinone-dicarbonitrile

According to the procedure disclosed in German Pat. No. 1,108,704, to 750 ml water was added in succession 18 gm sodium cyanide, 0.3 gm ammonium vanadate, 3.2 gm sodium acetate trihydrate, and 14 gm 1,4-diamino anthraquinone-2-sulfonic acid. This mixture was stirred and heated at 90° C. for 1 hour. Air was then bubbled through the mixture and after 4 hours a blue precipitate was recovered by filtration. This precipitate was water washed and over dried to recover the desired product in quantitative yield.

(b) Preparation of 1,4-diamino-2,3-anthraquinone dicarboximide

According to the procedure described in U.S. Pat. No. 2,753,356, to a hot (80° C.) stirred solution of 630 parts by weight 98.2% sulfuric acid in water, 126 parts by weight dried powdered 1,4-diamino-2,3-anthraquinone-dicarbonitrile, prepared according to Step (a) above, is added. An exothermic reaction occurs with the temperature rising to 140° C. The mixture is heated for 1 hour at 150° C. and is then cooled to about 40°–45° C. Keeping the mixture at this temperature, enough water (255 parts by weight) is added dropwise to make a 70% by volume acid solution. After cooling to room temperature, orange crystals are obtained and are separated by filtration. The orange crystals are washed with a 70% solution of sulfuric acid in water. The orange crystals are then slurried with water, keeping the temperature at about 70° to 80° C., for 90 minutes during which time the crystals changed from an orange to a blue color. The blue crystals are separated by filtration and are washed with hot water until the filtrate was acid free. After drying the product 1,4-diamino-anthraquinone-dicarboximide is obtained in a 73% yield.

(c) Preparation of
1,4-diaminoanthraquinone-N-(2-methylbutyl)-2,3-dicarboximide

Also according to the procedure described in U.S. Pat. No. 2,753,356, a mixture of 40 parts by weight 1,4-diamino anthraquinone-2,3-dicarboximide, prepared according to Step (b) above, 14 parts by weight (+)-2-methylbutylamine, 158 parts by weight methanol and 240 parts by weight nitrobenzene is heated for 16 hours at 175° C. The mixture is cooled to room temperature and the desired product is isolated by filtration. After washing with methanol and then water, the product yield is 90% of theoretical. The structure of the product is confirmed by NMR.

EXAMPLE 47

Helichromic (+)1,4-diamino anthraquinone-N-[2-methylbutylphenyl]-2,3-dicarboximide

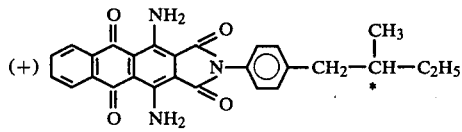

According to the procedure described in U.S. Pat. No. 2,628,963, a mixture of 46.2 parts by weight 1,4-diamine-2,3-anthraquinone-dicarboximide, prepared according to Example 46, Step (b), 60 parts by weight (+)-p-(2-methylbutyl)aniline, prepared according to Example 4, 400 parts by weight o-dichlorobenzene and 120 parts by weight methanol is heated with stirring in a steel autoclave for 4 hours at a temperature of from 175° to 180° C. Upon cooling, blue-bronze crystals are separated by filtration. These crystals are washed with alcohol until the filtrate is nearly colorless and dried to yield the desired product.

EXAMPLE 48

Helichromic (+)1,4-diaminoanthraquinone-N-[2-methyl benzyl]-2,3-dicarboximide

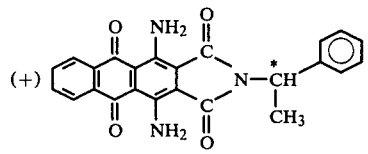

To 120 gm of a 10% by weight solution of oleum in water ($SO_3$ concentration 0–30%), 10.0 gm 1,4-diamine anthraquinone-2,3-dinitrile, prepared according to Example 46, step (a), is added portionwise keeping the mixture at 30° C. Stirring is continued for 2 hours at the same temperature. The reaction mixture is then cooled to a temperature of 0° to 5° C. and is added slowly to 1200 gm of ice water to form a precipitate which is collected by filtration. The separated precipitate is added to 400 gm water and dissolved by addition of a 20% sodium hydroxide solution followed by adjusting the pH to 13.0. Thereafter the temperature is raised to 80° to 90° C. and maintained at that level for six hours. After addition of 60 gm of a 78% solution of sulfuric acid in water, heating is continued for 1 hour. The solution is then cooled to 60° C. and the precipitate formed is collected by filtration, washed with water and dried.

A mixture of 9.24 gm of the above precipitate, 5.0 gm α-methylbenzyl amine (at a temperature of 38° C.) and 80 gm o-dichlorobenzene is heated at 80° to 100° C. for 4 hours. After cooling, the precipitate formed is collected by filtration, washed with small amounts of in succession o-dichlorobenzene, isobutanol, and hot water, and then dried. The desired product is obtained in a yield of 90% of theoretical. The structure of the helichromic compound is confirmed by NMR.

EXAMPLES 49 TO 56

The following procedure was used to produce the series of helichromic compounds, listed in Table IV, using the dichroic dye intermediates of Table III. Table III shows the structure, molecular weight, and amount of dichroic dye intermediate used in the following preparative example.

The indicated quantity of dichroic dye starting material was diazotized by dissolving it in 50 mls of a 20% solution of hydrochloric acid in water, cooling the solution to 0° C. with continuous stirring, and slowly adding dropwise over a period of 30 minutes 1.38 gm sodium nitrate as a 20% solution in water. Upon the completion of the nitrite addition, tetraazotization was allowed to occur and its progress was monitored by testing for free nitrous acid using starch-iodide test paper. When tetraazotization was complete (1 to 4 hours) the tetraazotized dye intermediate was rapidly added to a solution of 6.96 gm (+)-N-(2-methylbutyl)-α-napthylamine prepared according to the procedure of Example 13, dissolved in 50 ml glacial acetic acid. Keeping the solution at from 0° to 5° C. until coupling is complete (1 to 4 hours) and then raising the pH to 5 using sodium acetate trihydrate afforded the dye as a fine precipitate. The mixture was then neutralized using a 20% by weight solution of sodium hydroxide in water, and the product was collected by filtration. The collected product was washed with water until clear. The product was purified by column chromatography using silica and toluene/methanol as the eluent. The yield of product was 60 to 80% of theoretical. The structure of the product was confirmed by NMR.

TABLE III

| Example No. | Intermediate | Molecular Weight | Quantity used |
|---|---|---|---|
| 49 | $H_2N$—⟨⟩—N=N—⟨⟩—$NH_2$ | 212 | 2.12 gm |
| 50 | $H_2N$—⟨⟩—N=N—⟨⟩($CH_3$,$CH_3$)—$NH_2$ | 240 | 2.40 gm |
| 51 | $H_2N$—⟨⟩—N=N—⟨⟩($OCH_3$,$CH_3$)—$NH_2$ | 254 | 2.54 gm |

TABLE III-continued

| Example No. | Intermediate | Molecular Weight | Quantity used |
|---|---|---|---|
| 52 | H₂N—⟨○⟩—CH=CH—⟨○⟩—NH₂ | 210 | 2.10 gm |
| 53 | NH₂-(2,5-dimethylphenyl)-N=N-⟨○⟩-N=N-⟨○⟩-N=N-(2,5-dimethylphenyl)-NH₂ | 476 | 4.76 gm |
| 54 | H₂N—⟨○⟩—N=N—(naphthyl)—NH₂ | 262 | 2.62 gm |
| 55 | H₂N-(2,5-dimethylphenyl)-N=N-(2,5-dimethylphenyl)-NH₂ | 268 | 2.68 gm |
| 56 | H₂N—⟨○⟩—NH₂ | 158 | 1.58 gm |

TABLE IV

| Example No. | Helichromic Compound | Color and $\lambda_{max}$ Tol |
|---|---|---|
| 49 | *R—NH—(naphthyl)—N=N—⟨○⟩—N=N—⟨○⟩—N=N—(naphthyl)—NH—R* | Blue $\lambda_{max}$ 590 nm |
| 50 | *R—NH—(naphthyl)—N=N—⟨○⟩—N=N—(2,5-dimethylphenyl)—N=N—(naphthyl)—NH—R* | Blue $\lambda_{max}$ 600 nm |
| 51 | *R—NH—(naphthyl)—N=N—⟨○⟩—N=N—(OCH₃, CH₃-phenyl)—N=N—(naphthyl)—NH—R* | Blue $\lambda_{max}$ 605 nm |
| 52 | *R—NH—(naphthyl)—N=N—⟨○⟩—CH=CH—⟨○⟩—N=N—(naphthyl)—NH—R* | Magenta $\lambda_{max}$ 550 nm |
| 53 | *R—NH—(naphthyl)—N=N—(2,5-dimethylphenyl)—N=N—⟨○⟩—N=N—⟨○⟩—N=N—(2,5-dimethylphenyl)—N=N—(naphthyl)—NH—R* | Blue $\lambda_{max}$ 600 nm |
| 54 | *R—NH—(naphthyl)—N=N—⟨○⟩—N=N—(naphthyl)—N=N—(naphthyl)—NH—R* | Blue $\lambda_{max}$ 590 nm |

TABLE IV-continued

| Example No. | Helichromic Compound | Color and $\lambda_{max}$ Tol |
|---|---|---|
| 55 | *R—NH—[naphthyl]—N=N—[2,6-dimethylphenyl]—N=N—[2,6-dimethylphenyl]—N=N—[naphthyl]—NH—R* | Blue $\lambda_{max}$ 590 nm |
| 56 | *R—NH—[naphthyl]—N=N—[naphthyl]—N=N—[naphthyl]—NH—R* | Purple $\lambda_{max}$ 570 nm |

$$R^* = -CH_2-\overset{CH_3}{\underset{*}{C}H}CH_2C_2H_5$$

EXAMPLE 57

Helichromic (+)-2-[6-methoxybenzothiazolylazo]-5-[4-(2-methylbutylamino)naphthylazo]-1,4-dimethylbenzene

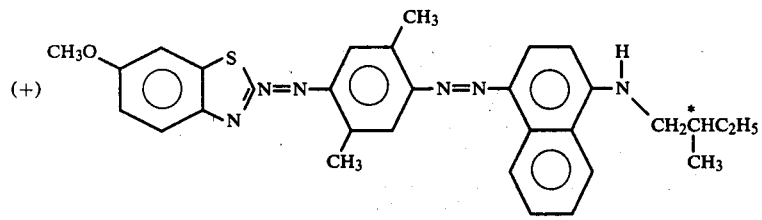

6-methoxy-2-aminobenzothiazole (5 gm) was dissolved in 120 ml dry 1,4-dioxane and the solution was warmed on a water bath to 60° C. Subsequently 4.05 ml of isoamyl nitrite, dissolved in 20 ml 1,4-dioxane was allowed to flow quickly into the reaction solution. Immediately, drop by drop, within a 25 minute period, 110 ml of a 1.5 molar sodium propanolate solution in n-propanol was added. The precipitate was filtered off with suction, digested with ether and dried. The 6-methoxybenzothiazole-2-diazotate as the monohydrate was recovered in 70% yield. The structure of the monohydrate was confirmed by NMR.

2.45 gm of the above compound was dissolved in 50 ml warm, distilled water and cooled to 10° C. 1.21 gm of 2,5-dimethyl aniline was dissolved in 100 ml glacial acetic acid. The diazotate solution was then dropped into the stirred acetic acid solution of amine. Immediately the bright red coupled product separated and an hour after the addition was completes the addition of 250 ml water separated the dye intermediate. A 20% by weight solution of sodium hydroxide in water was added until the pH was neutral (approximately 7) and the product was removed by filtration, washed with water, and dried at room temperature. The structure of the product was

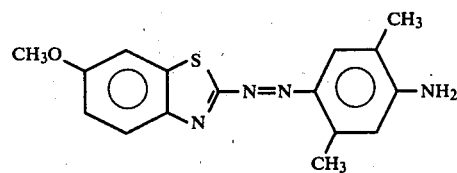

The above compound (4.56 gm) is dissolved in 40 gm of a 40% solution of nitrosylsulfuric acid, cooled to 0° C. and allowed to diazotize for 4 hours. Upon completion of the diazotization, the solution is poured into a solution of 3.4 gm (+)-N-(2-methylbutyl)-α-naphthylamine, prepared according to Example 13, in 50 ml glacial acetic acid. After allowing coupling to proceed for about 2 hours, sodium acetate is added to raise the pH to 5. Neutralization of the mixture to pH7 with a solution of 20% by weight sodium hydroxide in water, followed by filtration and water washed yields the helichromic dye. The structure of the dye is confirmed by NMR.

EXAMPLE 58

Helichromic (+)-1-(naphthylthiazolylazo)-4-[4-(2-methylbutylamino)naphthylazo]benzene

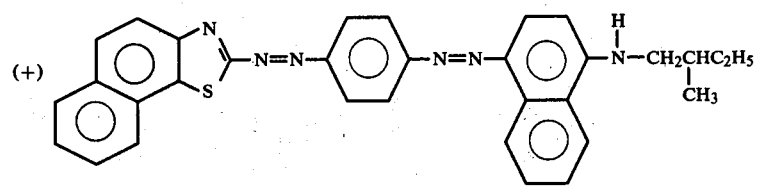

2-amino-naphtyl-[1,2]-thiazole (2.02 gm) was converted to the corresponding diazotate according to the procedure of Example 57. 2.38 gm of the diazotate was dissolved in 50 ml water at room temperature and slowly dropped into 100 ml of a 30% sulfuric acid in water solution containing 0.9 gm aniline. The coupling action occurred immediately and upon neutralization with a 30% by weight solution of sodium hydroxide in water the product was filtered and washed with water. 3 gm (90% theoretical) of the desired dye intermediate was obtained. The structure of the intermediate was dye intermediate was coupled to 1 equivalent (2.13 gm) of (+)-N-2-methylbutyl-α-naphthyl-amine prepared according to Example 13, by adding the above solution to a 20% glacial acetic acid solution containing the chiral α-amine and allowing coupling to occur. The coupled dye was recovered by neutralization (pH7) using 20% NaOH, filtered, washed with water, and dried overnight at 50° C. The structure of the helichromic product was confirmed by NMR.

EXAMPLE 60

Helichromic (+)-3-methylcyclohexyl dye

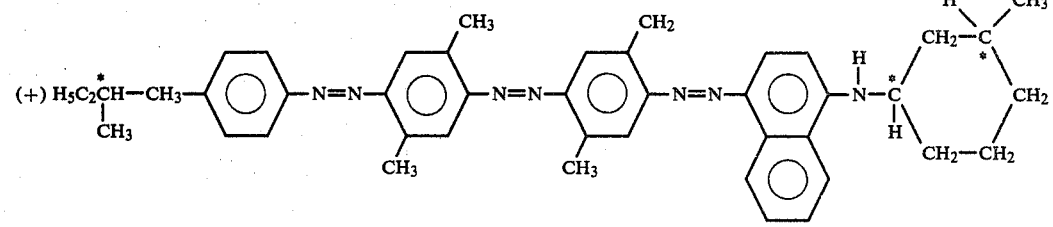

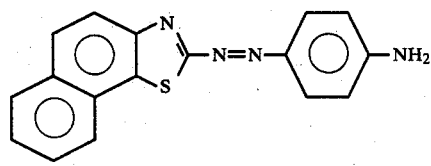

1.6 g of the above intermediate was diazotized in cold nitrosylsulfuric acid solution and coupled to one equivalent (1.74 gm) (+)-N-(2-methylbutyl)α-naphthylamine, prepared according to the procedure of Example 13 which had been dissolved in 50 ml glacial acetic acid. The desired blue helichromic compound was recovered by filtration. The structure of the product was confirmed by NMR.

EXAMPLE 59

Helichromic (+)-2-(6-ethoxybenzothiazoylazo)-5-[4-(2-methylbutylamino)naphthylazo]-1,4-dimethylbenzene The helichromic dye intermediate (+)-p-2methyl-butyl)phenylazo-[2,5]-dimethylphenylazo-[2,5]-dimethylaniline (4.27 gm), prepared according to Example 18 was dissolved in 50 ml of a solution of 50% sulfuric acid in water and cooled to 0° C. Sodium nitrite (0.69 gm) as a 20% by weight solution in water was added dropwise and stirring was continued for 4 hours. Complete diazotization occurred and the clear diazonium was poured into a solution of 50 ml glacial acetic acid containing 2.23 gm (+)-N-(-3-methylcyclohexyl)-α-naphthylamine, prepared according to Example 16. Coupling was allowed to occur for 1 hour and the product was neutralized with a 20% sodium hydroxide in water solution and filtered. The dye product was purified by chromatography using silica gel and a 4:1 toluene/methanol solution as the eluent. The structure of the helichromic product was confirmed by NMR.

EXAMPLE 61

Helichromic (+)-4-[4-(2-methylbutyl)phenylazo]-4'-[4-(camphanylamino)naphthylazo]-azobenzene

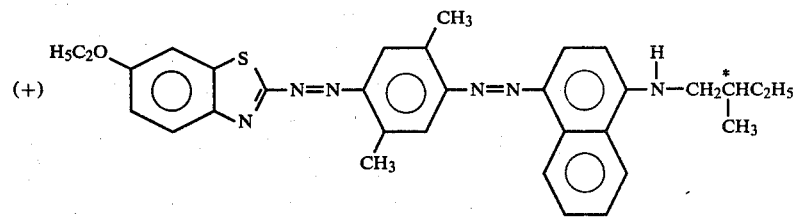

One equivalent of the dye intermediate 6-ethoxybenzothiazolyl-2-azo-(2,5-dimethyl)aniline, prepared as was the aniline in Example 57, was dissolved in a solution of 40% nitrosylsulfuric acid in water at 0° C. The

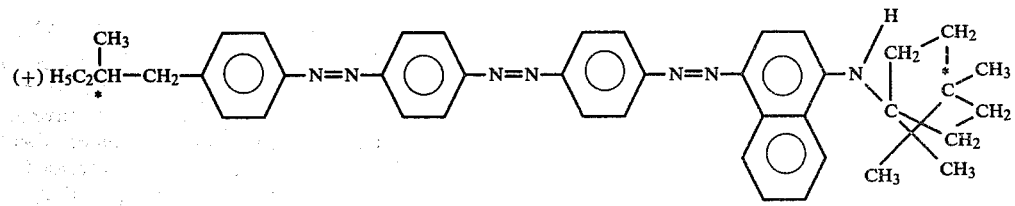

(+)-N-camphanyl-α-naphthylamine (2.26 gm), prepared according to Example 15, was dissolved in 25 ml glacial acetic acid. (+)-p-(2-methylbutyl)phenylazo(-phenylazo)aniline (0.1 mole), prepared according to Example 19, was dissolved in 50 ml 87% sulfuric acid and diazotized using 40% nitrosylsulfuric acid in water (0.1 mol) added dropwise to the amine at 5° to 10° C. After the completion of diazotization the solution of chiral α-naphthylamine in acetic acid was added to the diazo solution along with 100 gm ice. After the coupling reaction occurred (1 hour) the mixture was diluted with 100 gm water and solid sodium acetate trihydrate was added until the pH was 5. The solution was then brought to pH 7 using a solution of 20% sodium hydroxide in water. The solid dye was collected by filtration, dried and recrystallized from toluene. Chromatography on silica using dichloromethane as eluent afforded the desired helichromic compound. The structure of the helichromic dye was confirmed by NMR.

EXAMPLE 62

Helichromic
(+)-1-[4-(4-methylhexyl)phenylazo]-4-[4-(2-methylbutyl)benzylidene]naphthalene

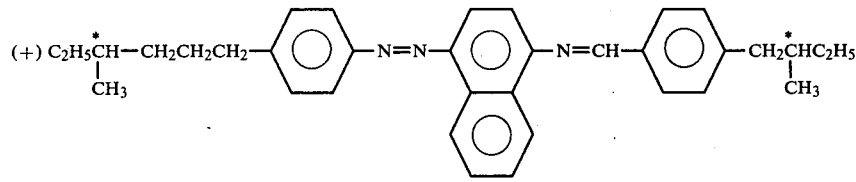

(+)4-(4-methylhexyl)aniline (18.1 gm), prepared according to Example 17, is added to a solution of 100 ml concentrated hydrochloric acid and 100 ml water. The slurry is stirred, cooled 0° C., and diazotized using 6.9 gm sodium nitrite. The clear diazonium solution is then added to a solution of 15.1 gm 4-aminonaphthylene in 50 ml glacial acetic acid. Coupling occurs and the pH is adjusted to 5 by addition of solid sodium acetate trihydrate. The coupled product is recovered by neutralizing the mixture with a solution of 25% sodium hydroxide in water, and collecting the product by filtration. The product (24.7 gm) is then dissolved in 100 ml hot ethanol and 17.6 gm (+)-4-(2-methylbutyl)benzaldehyde, prepared according to Example 11, is added. To this mixture is added 0.1 gm p-toluene sulfonic acid and the dye product forms almost immediately. Upon cooling the product is collected by filtration. Chromatography on silica using toluene as eluent affords the helichromic dye. The structure of the dye is confirmed by NMR.

EXAMPLE 63

Helichromic
(+)-1-[p-(4-methylhexyl)anilino]-4-hydroxyanthraquinone

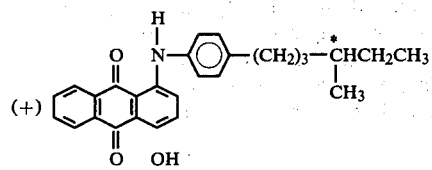

1-Chloro-4-hydroxyanthraquinone (27.8 gm) is dissolved in 200 ml nitrobenzene in a boiling flask fitted with a stirrer and reflux condensor. After heating to 80° C., 18.1 gm (+)-4-methylhexyl)aniline, prepared according to Example 17, is added followed by the addition of 0.1 gm copper acetate and 20 gm sodium acetate. The mixture is stirred and heated to 150° C. for 4 hours. The mixture is then cooled to 80° C. and 500 ml ethanol is added. When cooled to room temperature the crude dye is separated by filtration, water and alcohol washed, and dried overnight. Chromatography on alumina using toluene as eluent affords the pure helichromic compound. The structure of the compound is confirmed by NMR.

EXAMPLE 64

Helichromic (+)1,4-bis-(2-methylbutyl)benzylidene naphthylene

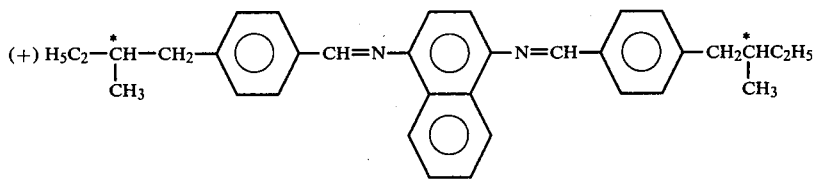

(+)-4-(2-methylbutyl)benzaldehyde (34 gm), prepared according to Example 11, is added to a solution of 15.8 gm 1,4-diaminonaphthylene in 100 ml methanol. The solution is heated to reflux and 10 ml glacial acetic acid is added. The condensation occurs immediately and upon cooling, the solid dye is filtered and recrystallized from benzene. The structure of the helichromic dye is confirmed by NMR.

EXAMPLE 65

The reduction in "optical bounce" and in decay time for twist nematic liquid crystal displays utilizing a helichromic dye of the present invention were demonstrated in the following manner. Twist nematic display cells were assembled as described in U.S. Pat. No. 3,918,796. Each cell comprised opposing glass plates coated on their interior surfaces with tin/indium oxides to form a conductive electrode pattern. Overlaying the electrode pattern a 200 Å thick transparent silicone monoxide homogeneous orientation layer was deposited. The plates were assembled so the homogeneous surfaces were oriented essentially at right angles to each other. In this orientation, when the nematic liquid crystal mixture is filled into the cell polarized light will be propagated along the liquid crystal axis and will rotate 90° as it passes through the cell. The two oriented surfaces were separated by an enclosing gasket spacer which separated the plates by a uniform distance of 7 microns.

Polaroid "HN 45" polarizers were fitted to the front and rear surfaces of the cell and a metallic reflector was affixed to the rear surface of one of the polarizers to produce a reflective display. Three fill mixtures were prepared to demonstrate the effect of the helichromic compounds of the present invention. One fill mixture was pure "E-7", a positive nematic liquid crystal material, available from BDH Chemicals, Poole, England. Another fill mixture was "E-7" doped with 1% by weight cholesteryl nonanoate. The third mixture was "E-7" and 0.5% by weight helichromic (+)-1-[4-(2-methylbutyl)-anilino—4-hydroxyanthraquinone, prepared according to the procedure of Example 28.

An oscilloscope trace was used to observe the optical rise and decay pattern of cells filled with each of the above mixtures, as a function of time, when the cells were subjected to the following test procedure: The filled cell was mounted on an optical bench and a collimated tungsten light source located at an angle of 45° with respect to the cell surface, was focused on the display. An intermittent RMS voltage of 5 volts at 1 kHz was impressed across the electrode surfaces of the cell. The electro-optic modulation of each cell was observed via light reflected from the cell to a photometer, (Spectra Physics Co., Princeton, N.J.), fitted with a photopic filter and connected to a time base oscilloscope. In this way the optical contrast and the rise and decay characteristics of each display were determined.

The display cell filled with "E-7" containing no optically-active dopants exhibited a severe optical bounce which caused an extended decay time when the voltage applied across the cell was removed.

The display cell filled with 1% by weight cholesteryl nonanoate in "E-7" exhibited no detectable optical bounce and a radically reduced decay time, as compared to the cell containing only "E-7".

The display filled with 0.5% by weight helichromic (+)-1-[4(2-methylbutyl)anilino]-4-hydroxyanthraquinone in "E-7" exhibited no detectable optical bounce and a decay time comparable to the cell doped with 1% cholesteryl nonanoate.

EXAMPLE 66

The reduction in decay time for guest-host type liquid crystal displays utilizing a helichromic dye of the present invention was illustrated in the following manner: Guest-host cells were assembled as in Example 65, however, since the cooperatively aligned helichromic compound absorbs one polarization of light, one polarizer was eliminated. Three "guest-host" mixtures were prepared. One mixture was "PCH 1132" positive nematic liquid crystal material available from the E. M. Merck Co., and 1% by weight of the pleochroic dye, 1,5-bis-(4butyl anilino)anthraquinone. Another mixture was "PCH 1132" and 1% by weight of the above dye with 1% by weight of the optically-active additive agent "CB-15" available from BDH Chemicals, Inc. The third mixture was "PCH 1132" containing 1% by weight of the helichromic dye (+)1,5-bis-[4-(2-methylbutyl)anilino]anthraquinone prepared according to the procedure of Example 27.

An oscilloscope trace was used to observe the optical rise and decay pattern as a function of time when each cell was illuminated and subjected to an intermittent electric field as in the procedure of Example 65.

The cell containing dye in "E-7" exhibited a severe optical bounce and a protracted decay time when the voltage applied across the cell was removed.

The cell containing 1% dichroic dye and 1% "CB-15" exhibited no detectable optical bounce and sharp decay characteristics.

The cell containing 1% helichromic dye exhibited no detectable optical bounce and sharp decay characteristics, similar to the cell containing "CB-15". This example illustrates the effectiveness of the helichromic dyes of the present invention in reducing optical bounce. In addition, in helichromic displays only 1% by weight foreign additive (helichromic dye) is required to produce a display having the same optical characteristics as a conventional display containing 2% by weight foreign additives (dichroic dye plus optically-active additive).

EXAMPLE 67

The reduction in after image scattering for displays utilizing a helichromic dye of the present invention was illustrated as follows.

Cells were assembled having electrode surfaces rendered homeotropic by the vapor deposition of a dielectric silicone monoxide layer about 100 Å, at a normal angle less than 30°. The cells are provided with a reflectorized backing but have no polarizers. The front and rear electrode surfaces had a 10 micron spacing between them.

Two fill mixtures were prepared. One fill mixture was a "phase change" liquid crystal mixture containing "E-7" liquid crystal material, 2% by weight of a dichroic dye mixture and 10% by weight of the optically-active additive cholesteryl nonanoate. The dye mixture comprised

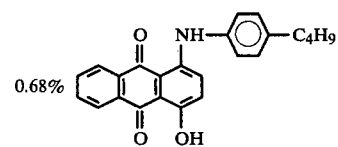

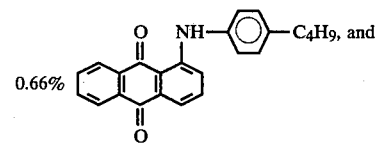

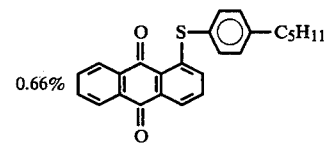

The other fill mixture was a mixture of 2% by weight helichromic compounds in "E-7" liquid crystal material. The helichromic dye mixture comprises

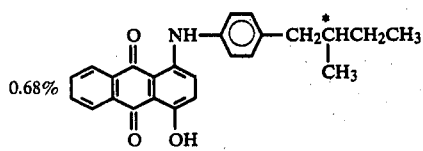

(made according to the procedure of Example 29)

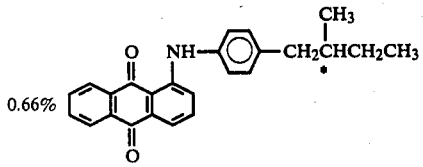

(made according to the procedure of Example 27) and

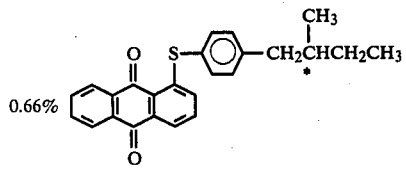

Each of the above filled cells were illuminated and subjected to an intermittent voltage of 10 V while an oscilloscope traced the optical response of the cell, as in Example 65. The resultant oscilloscope trace is illustrated in FIG. 2.

Referring to FIG. 2, at time 0, 10 V was applied across the cell. At 200 milliseconds the voltage across the cell was reduced to zero. The dotted line G in the figure represents the optical response of the cell containing the helichromic compound. The solid line F represents the optical response of the cell containing the dichroic dye and cholesteryl nonanoate. The cell containing the helichromic dye exhibited no after-image scattering of light approximately 75 milliseconds (T=275 ms.) after the voltage was eliminated. In comparison the cell containing the dichroic dye and cholesteryl nonanoate began to show after image scattering at about T=300 ms. and continued to show significant after-image scattering of light even 700 milliseconds (T=900 ms.) after the voltage was removed. Thus, FIG. 2 illustrates that phase change displays utilizing the helichromic dyes of the present invention have rapid decay times with no after image scattering as compared to the "phase change" displays of the prior art. The brightness of the on state (Vmax) and absorbance in the off state (V=0) were equivalent for the two displays.

EXAMPLE 68

The reduction in the voltage requirements for helichromic displays of the present invention was demonstrated by measuring the perceived contrast ratios and the corresponding threshold voltages required to obtain such contrast ratios for displays containing the helichromic compounds and for displays containing conventional "phase change" type mixtures. In addition, the effect of helichromic compound concentration on perceived contrast ratio was compared with the effect of optically-active cholesterol nonanoate concentration on perceived contrast ratio.

Display cells were assembled as in Example 67. "Phase change" type liquid crystal mixtures were prepared containing the dichroic dye mixture of Example 67, and the optically-active additive, cholesteryl nonanoate, in "E-7" positive nematic liquid crystal material. Helichromic liquid crystal mixtures were also prepared containing the mixture of helichromic compounds described in Example 67, in "E-7".

Displays were filled with the above two types of mixtures and an electric field (100 Hz) was applied to each display. The perceived contrast ratio was measured using the photometer described in Example 67 and a photopic filter which exhibits maximum light transmittance at 550 nm. The perceived contrast ratio is a photopic measurement, $$\frac{\text{Brightness cell on (V = 0)}}{\text{Brightness cell off (V > 0)}} - 1 = \frac{\text{Transmission cell on}}{\text{Transmission cell off}} - 1$$

Perceived contrast ratio was plotted against the minimum voltage required to achieve a particular perceived contrast ratio for any cell fill composition.

Referring to FIG. 1, dotted curve A represents the optical response of a cell containing 1% by weight helichromic compound in "E-7". Dotted curve B represents the optical response of a cell containing 3% by weight helichromic compound in "E-7". Curves C, D and E represent the optical response of cells containing 4.5% by weight of the dichroic dye and 4%, 8%, and 12% by weight cholesteryl nonanoate in "E-7", respectively.

As illustrated by FIG. 1, the minimum voltage required to reach any particular contrast ratio is lower for the helichromic displays. FIG. 1 also illustrates that helichromic displays need lesser amounts of foreign additives than phase-change displays to reach any perceived contrast ratio.

What we claim is:

1. A composition consisting essentially of a nematic liquid crystal material and, in admixture therewith, an organic, nonionic, nonliquid-crystalline helichromic compound, said helichromic compound being soluble in said nematic liquid crystal material, and said helichromic compound being a dichroic dye and having the general formula $$Q+Z)_n$$

wherein:
Q is a radical selected from the group consisting of azo, azo-stilbene, benzothiazolyl polyazo, methine, azo-methine, merocyanine and methine arylidene radicals;
Z is an organic group capable of imparting helical ordering characteristics to said mixture of nematic liquid crystal and helichromic compound; and
n is an integer having a value of 1 or greater.

2. A composition consisting essentially of a nematic liquid crystal material and, in admixture therewith, an organic, nonionic, nonliquid-crystalline helichromic compound, said helichromic compound being soluble in said nematic liquid crystal material, and said helichromic compound being a dichroic dye and having the general formula $$Q+Z)_n$$

wherein:
Q is an anthraquinone radical;
n is 1 and

Z is an organic group capable of imparting helical ordering characteristics to said mixture of nematic liquid crystal material and helichromic compound, and Z is substituted in the 1, 4, 5, position of Q.

3. A composition consisting essentially of a nematic liquid crystal material and, in admixture therewith, an organic, nonionic, nonliquid-crystalline helichromic compound, said helichromic compound being soluble in said nematic liquid cyrstal material, and said helichromic compound being a dichroic dye and having the general formula Q+Z)$_n$ wherein:
Q is an anthraquinone radical;
n is 2; and
Z is an organic group capable of imparting helical ordering characteristics to said mixture of nematic liquid crystal material and helichromic compound, and Z is substituted in the 1 and 4, or 1 and 8 positions of Q.

4. A composition consisting essentially of a nematic liquid crystal material and, in admixture therewith, an organic, nonionic, nonliquid-crystalline helichromic compound, said helichromic compound being soluble in said nematic liquid crystal material, and said helichromic compound being a dichroic dye and having the general formula Q+Z)$_n$ wherein:
Q is an anthraquinone radical;
Z is an organic group capable of imparting helical ordering characteristics to said mixture of nematic liquid crystal and helichromic compound, and Z includes a linking group linking it to said Q, wherein said linking group is selected from the group consisting of —CH=N—, —CH=CH—, —N=N—, —O—, -(-CH$_2$)$_p$, —O-(-CH$_2$)$_p$, —C-(-CH$_3$)$_2$—,

—C$_6$H$_{10}$—, phenyl groups, naphthyl groups and combinations thereof, wherein p is 1, 2, 3, 4 or 5, and Z is substituted in the 1, 4, 5 or 8 position of Q or any combination thereof; and
n is an integer having a value of 1 or greater.

5. A composition consisting essentially of a nematic liquid crystal material and, in admixture therewith, an organic, nonionic, nonliquid-crystalline, helichromic compound, said helichromic compound being soluble in said nematic liquid crystal material, and said helichromic compound being a dichroic dye having the general formula Q+Z)$_n$ wherein:
Q is an anthraquinone heterocyclic dicarboximide radical;
n is an integer equal to 1; and
Z is an organic group capable of imparting helical ordering characteristics to said mixture of nematic liquid crystal and helichromic compound, and Z is substituted on the nitrogen of said heterocyclic dicarboximide radical.

6. The composition of claim 1 wherein n is an integer having a value of 1 or 2.

7. The composition of claims 1, 2, 3, 4 or 5 wherein Z comprises an asymmetric carbon atom.

8. The composition of claims 1, 2, 3, 4 or 5 wherein Z is selected from the group consisting of a (+)-2-methylalkyl group, a (+)-3-methylalkyl group, a (+)-citronellyl group, a (+)camphanyl group, a (+)-3-methylcyclohexyl group, and a (+)-α-methylbenzyl group.

9. The composition of claim 1 wherein said helichromic compound is selected from the group consisting of

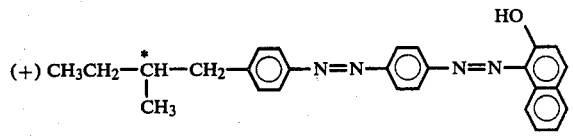

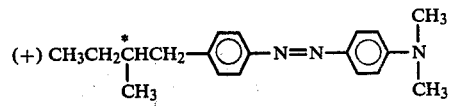

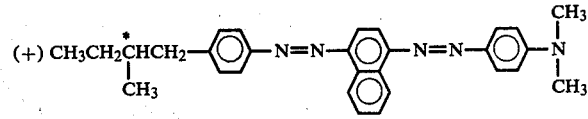

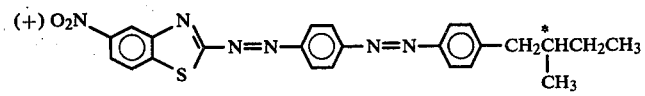

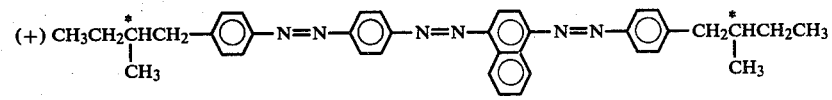

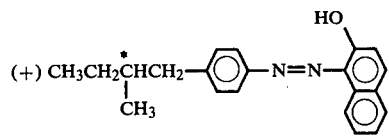
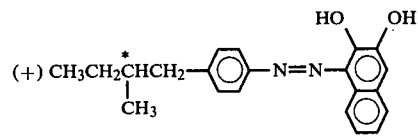
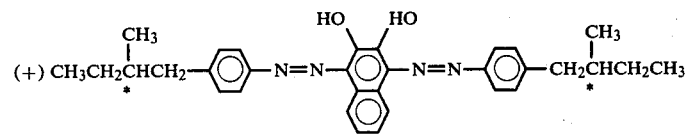
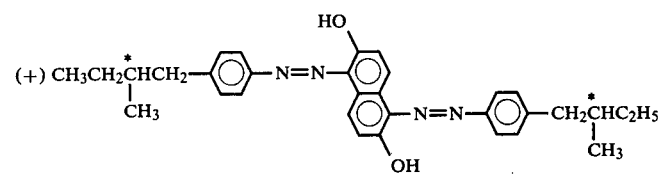
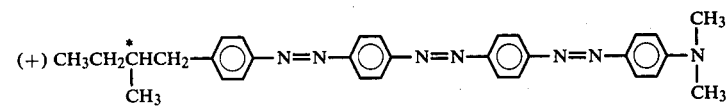
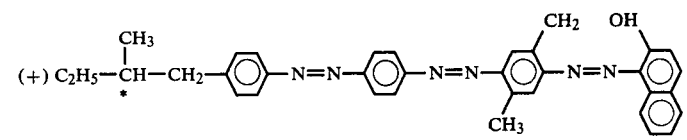
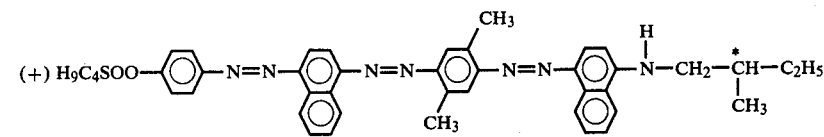
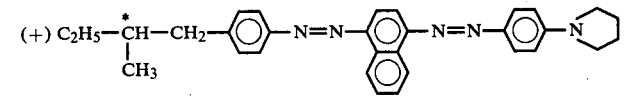
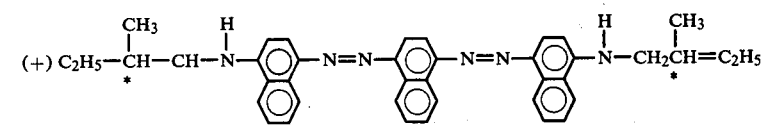
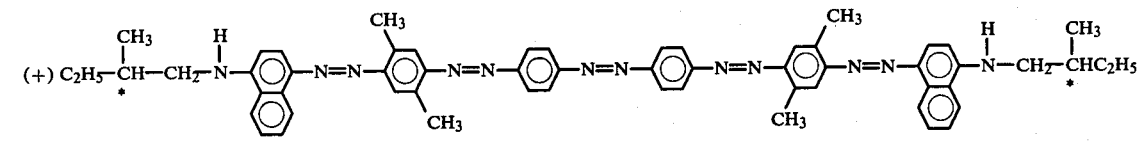
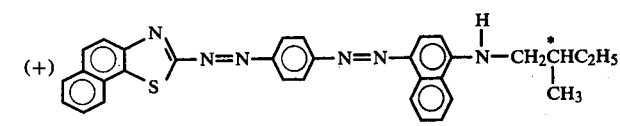

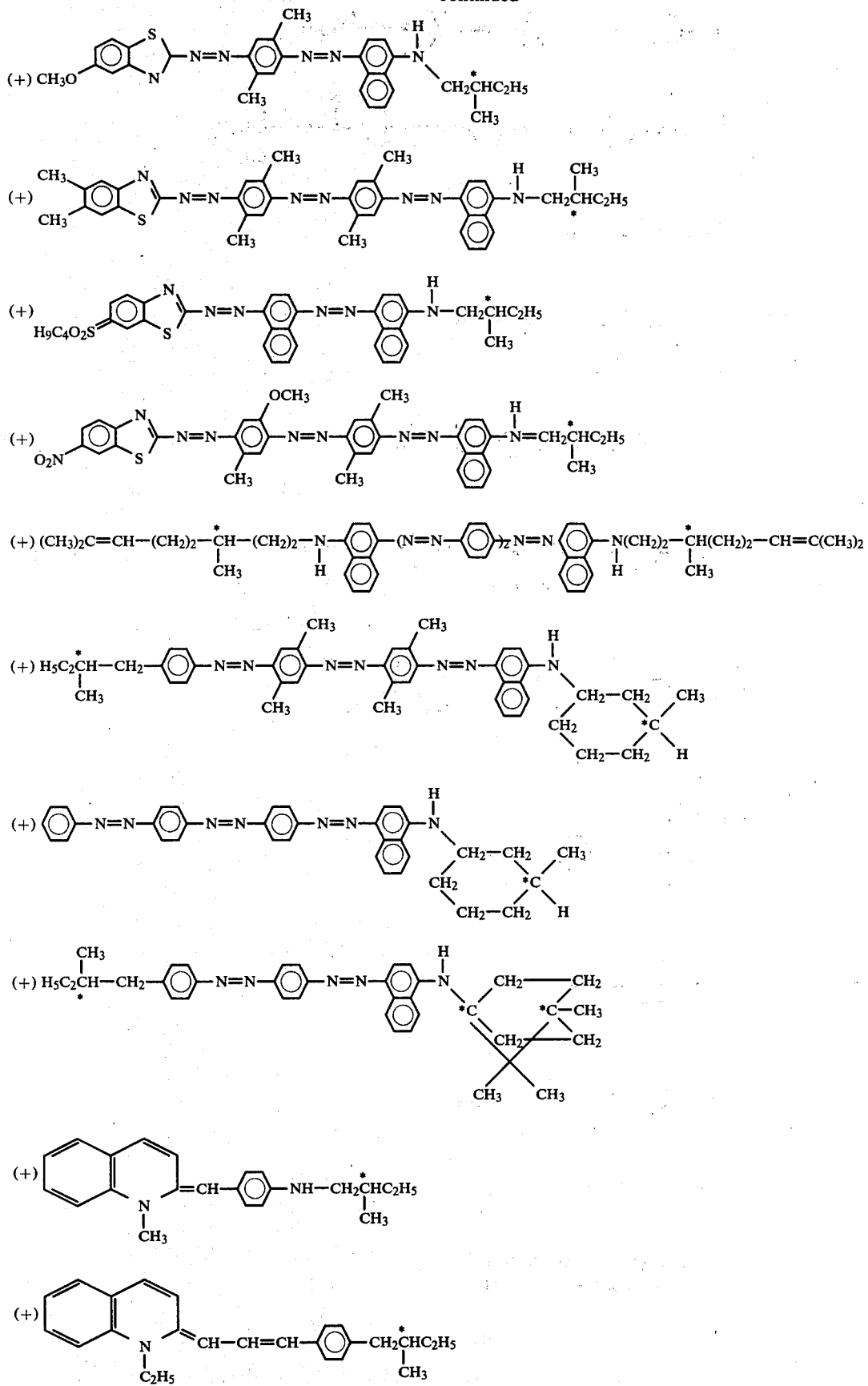

-continued
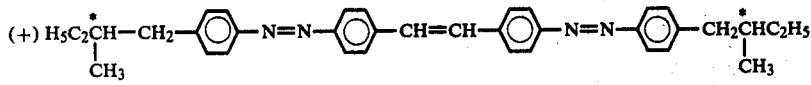
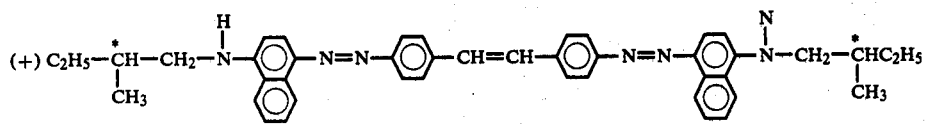
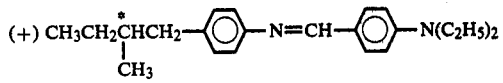
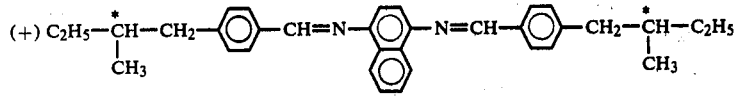
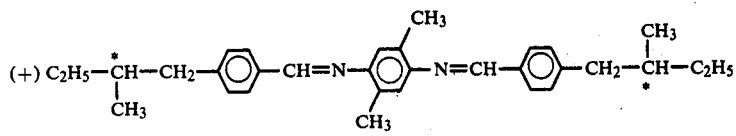
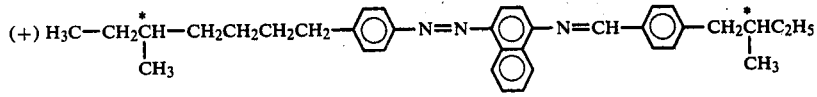
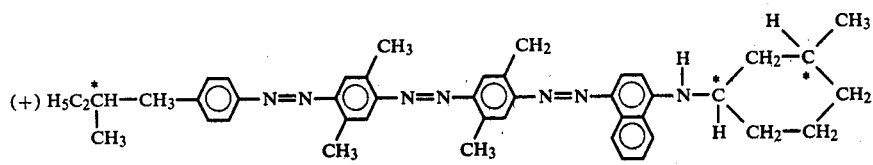
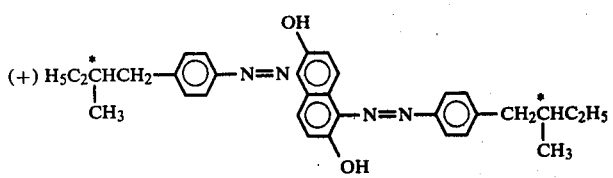
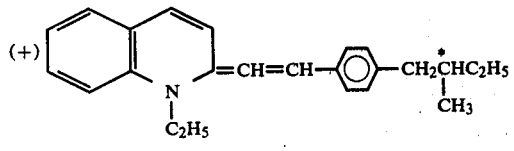
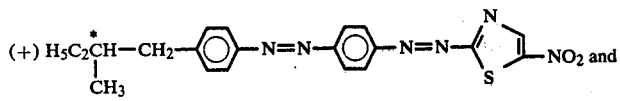
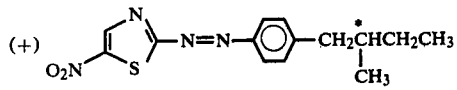
10. The composition of claim 3 wherein said helichromic compound is selected from the group consisting of 11. The composition of claim 4 wherein said helichromic compound is selected from the group consisting of

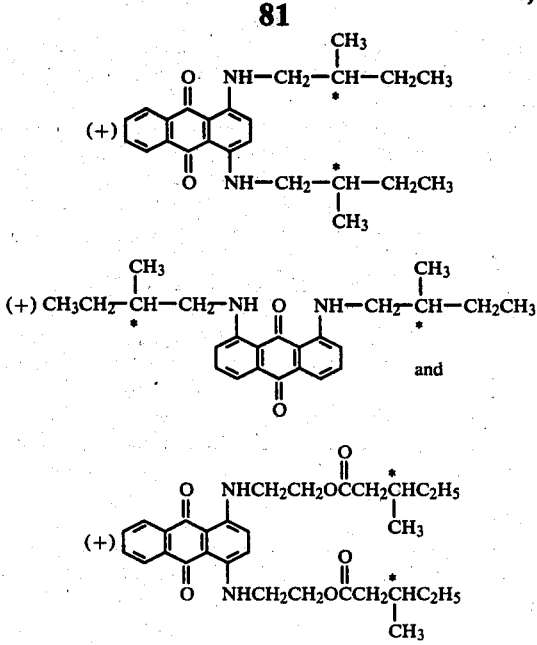

12. The composition of claim 5 wherein said helichromic compound is selected from the group consisting of

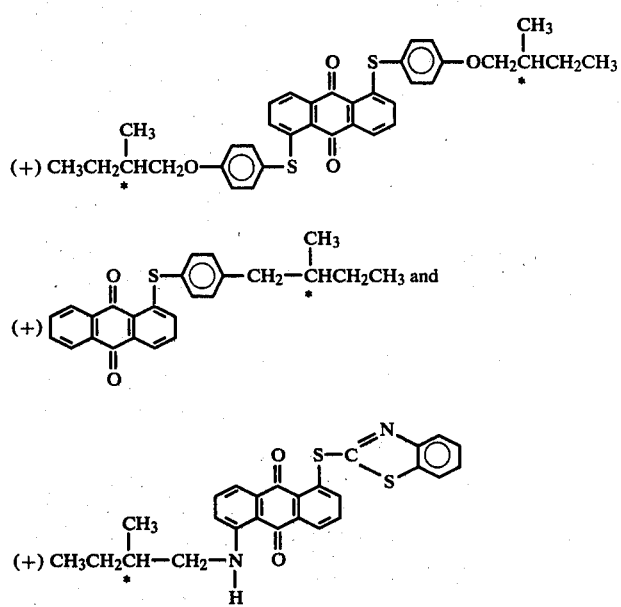

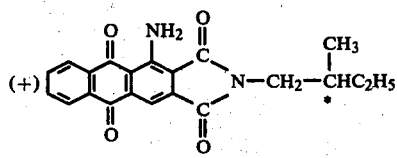

-continued

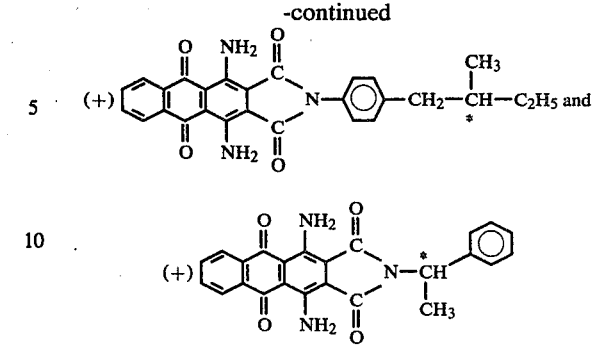

13. A liquid crystal display device which is responsive to the absence or presence of an electric field, said device comprising one auxiliary polarizer, a layer of nematic liquid crystal composition, and two conductive electrodes positioned, respectively, adjacent opposing surfaces of said layer, said nematic liquid crystal composition being the composition of claim 1, 2, 3, 4 or 5, and said helichromic compound being present in an amount ineffective to allow said mixture to substantially absorb unpolarized light incident thereon in the absence of an electric field, but effective to provide said mixture with the ability to substantially absorb polarized light incident thereon in the absence of an electric field, and to substantially transmit said polarized light incident thereon in the presence of an electric field.

14. The liquid crystal display device of claim 13 wherein said helichromic compound is present in a concentration of between about 0.5% and 2% by weight of said liquid crystal composition.

15. A liquid crystal display device which is responsive to the absence or presence of an electric field, said device comprising two auxiliary polarizers, a layer of nematic liquid crystal composition, and two conductive electrodes positioned, respectively, adjacent opposing surfaces of said layer, said nematic liquid crystal composition being the composition of claim 1, 2, 3, 4 or 5, and said helichromic compound being present in an amount ineffective to allow said mixture to substantially absorb unpolarized or polarized light incident thereon in the absence of an electric field, but effective to eliminate the hydrodynamic effect of optical bounce and reduce decay time.

16. The liquid crystal display device of claim 15 wherein said helichromic compound is present in a concentration between about 0.1 and 1.0 percent by weight of said liquid crystal composition.

17. A liquid crystal display device which is responsive to the absence or presence of an electric field, said device having no auxiliary polarizers and comprising a layer of a nematic liquid crystal composition and two conductive electrodes positioned, respectively, adjacent opposing surfaces of said layer, said nematic liquid crystal composition consisting essentially of a nematic liquid crystal material and, in admixture therewith, an organic, nonionic, nonliquid-crystalline helichromic compound, said helichromic compound being soluble in said nematic liquid crystal material, said helichromic compound being a dichroic dye, said helichromic compound comprising at least one helical ordering moiety capable of imparting helical ordering characteristics to said mixture of nematic liquid crystal and helichromic compound, and said helichromic compound being present in said mixture in an amount effective to allow said mixture to substantially absorb unpolarized light incident thereon in the absence of an electric field and to substantially transmit unpolarized light incident thereon in the presence of an electric field.

18. The liquid crystal display device of claim 17 wherein said helichromic compound is present in a concentration of between about 1 and 5 percent by weight of said liquid crystal composition.

19. A display device according to claim 13, 15 or 17 wherein said device includes a means for applying an electric field across said electrodes.

20. The liquid crystal display device of claim 17 wherein said helical ordering moiety comprises an asymmetric carbon atom.

21. The liquid crystal display device of claim 17 wherein said helichromic compound has the general formula Q(-Z)$_n$ wherein:
Q is an organic group having a chomophoric character;
Z is an organic group having a helical ordering character capable of imparting helical ordering characteristics to a mixture of nematic liquid crystal material and said helichromic compound; and
n is an integer having a value of 1 or greater.

22. The liquid crystal display device of claim 21 wherein n is an integer having a value between 1 and 4.

23. The liquid crystal display device of claim 21 wherein Z is an organic group having an asymmetric carbon atom.

24. The liquid crystal display device of claim 23 wherein Z is selected from the group consisting of a (+)-2-methylalkyl group, a (+)-3-methylalkyl group, a (+)-citronellyl group, a (+)-camphanyl group, a (+)-3-methylcyclohexyl group, and a (+)-α-methylbenzyl group.

25. The liquid crystal display device of claim 21 wherein Q is a radical selected from the group consisting of azo, azo-stilbene, benzothiazolyl polyazo, methine, azo-methine, merocyanine and methine arylidene radicals.

26. The liquid crystal display device of claim 31 wherein Q is an anthraquinone radical and Z is substituted in the 1, 4, 5 or 8 position of Q, or any combination thereof.

27. The liquid crystal display device of claim 21 wherein Q is an anthraquinone heterocyclic dicarboximide radical and Z is substituted on the nitrogen of said heterocyclic dicarboximide radical.

28. The liquid crystal display device of claims 26 wherein Z additionally comprises a linking group linking said Z organic group group to said Q, wherein said linking group is selected from the group consisting of —CH=N—, —CH=CH—, —N=N—, —NH—, —N(alk)—, —O—, —S—, +CH$_2$+$_p$, —O+CH$_2$+$_p$, —C(CH$_3$)$_2$—,

—C$_6$H$_{10}$—, phenyl groups and naphthyl groups and combinations thereof, wherein p is 1, 2, 3, 4 or 5.

29. The liquid crystal display device of claim 21 wherein Q additionally comprises one or more ballasting groups selected from the group consisting of NH$_2$, +CH$_2$+$_p$CH$_3$, —O+(CH$_2$+$_p$CH$_3$, —CH(CH$_3$)$_2$,

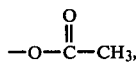

C$_6$H$_{11}$, phenyl groups, naphthyl groups and combinations thereof, wherein p is 0, 1, 2, 3 or 4.

30. The liquid crystal display device of claim 21 wherein Q comprises at least one aromatic ring having one or more substituents independently selected from the group consisting of lower alkyl, lower alkoxy, F, Cl, Br, NO$_2$, NH(alk), N(alk)$_2$, OH, CN, CF$_3$, and CH$_3$, substituted thereon.

31. The liquid crystal display device of claim 17 wherein said helichromic compound is selected from the group consisting of

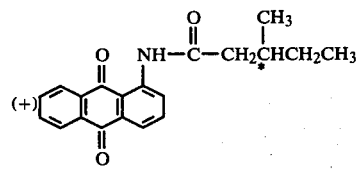

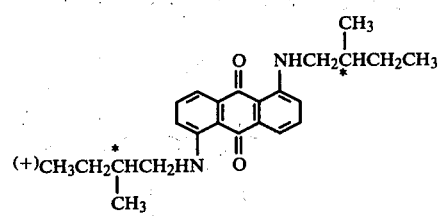

-continued
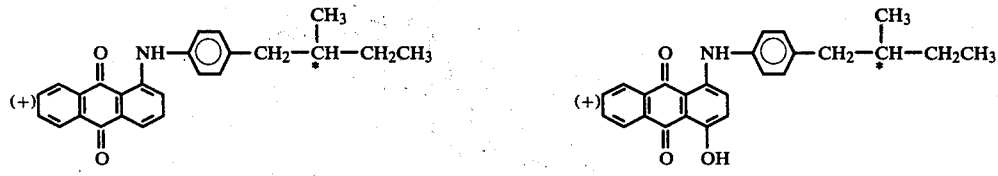
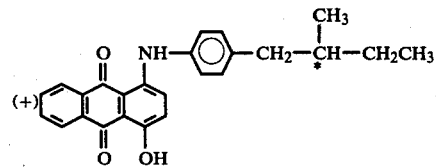
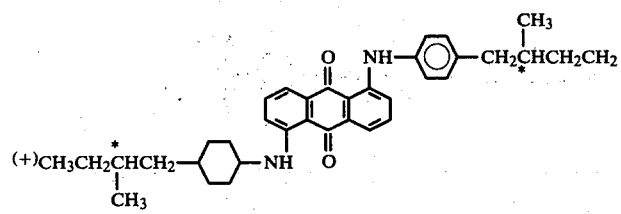
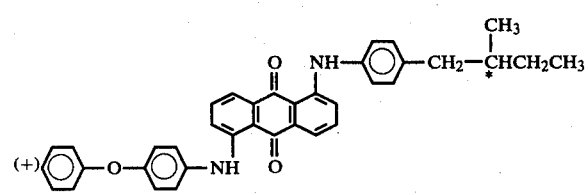
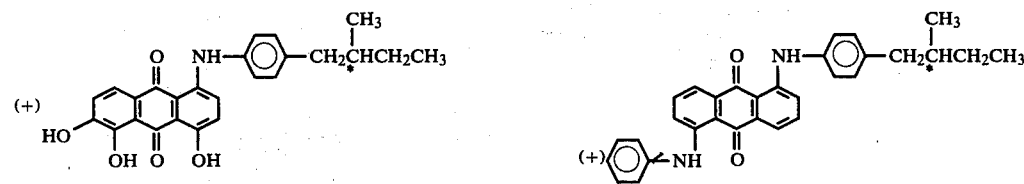
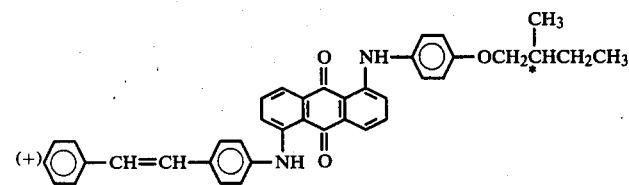
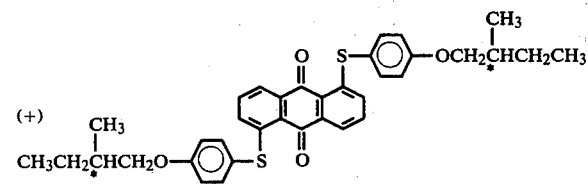
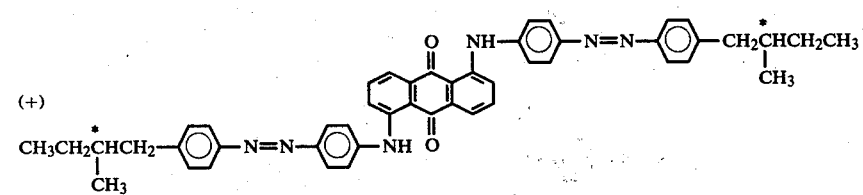
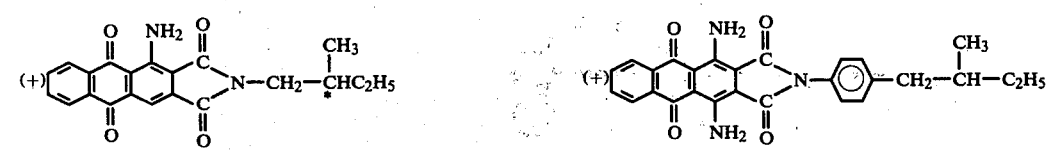

-continued
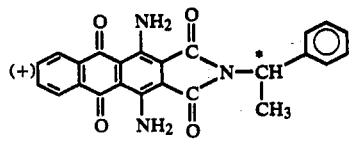
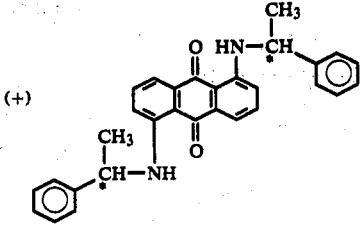
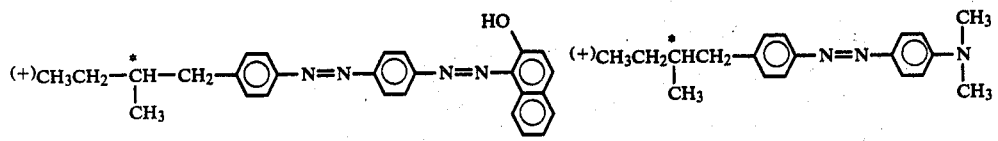
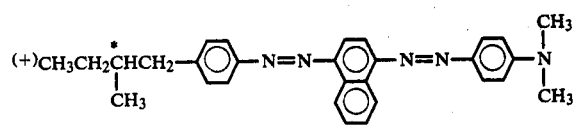
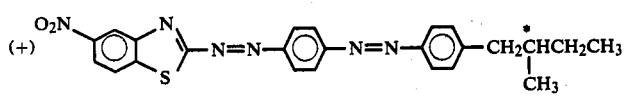
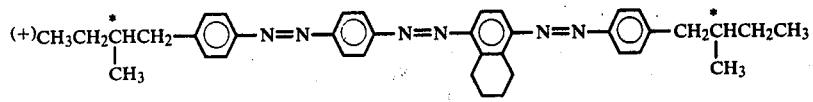
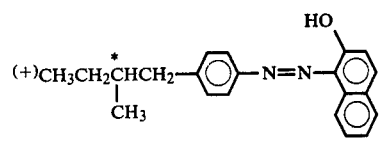
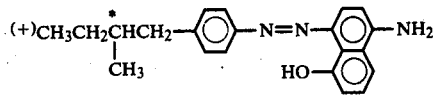
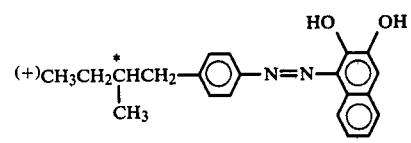
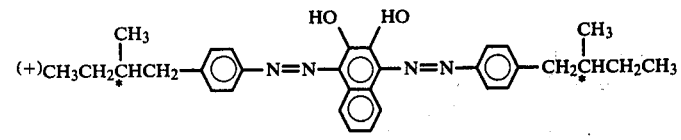
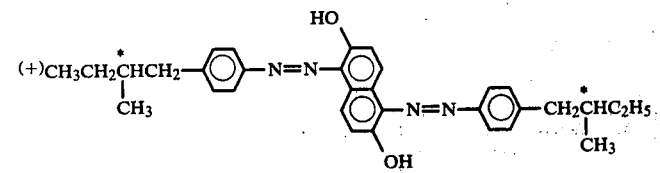
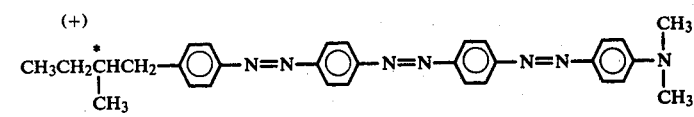
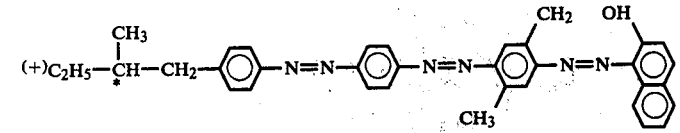

-continued
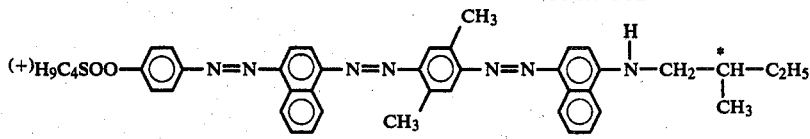
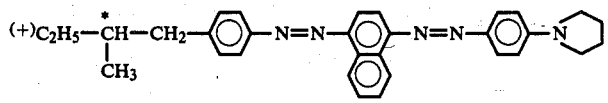
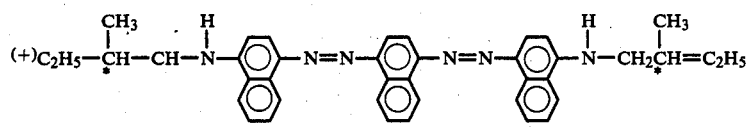
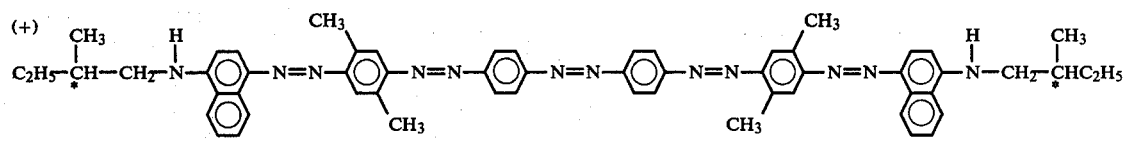
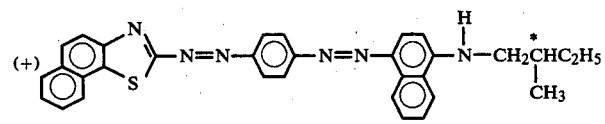
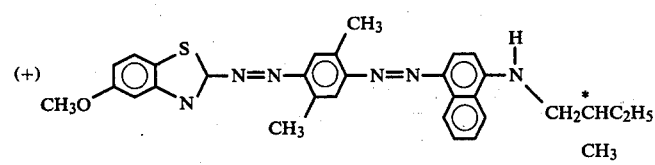
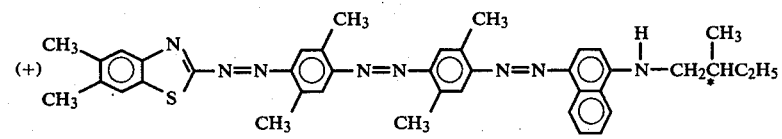
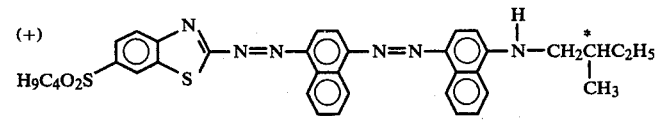
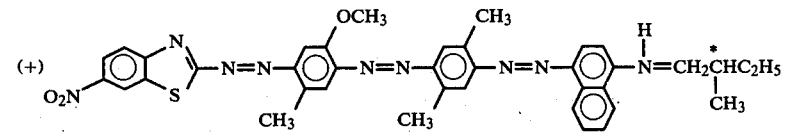
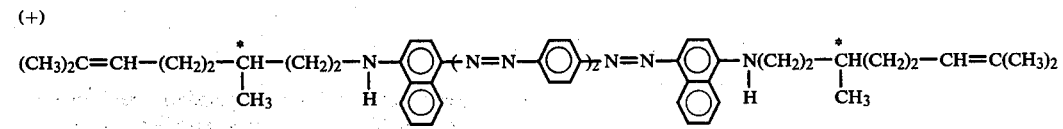
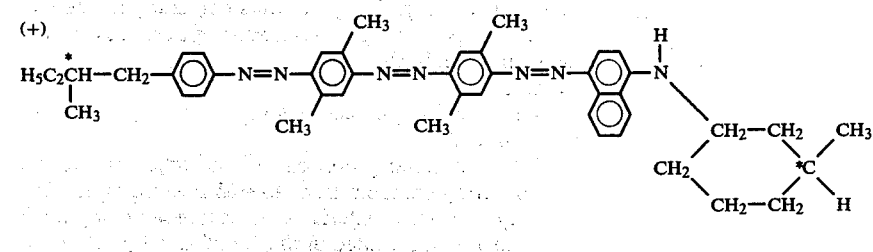

-continued

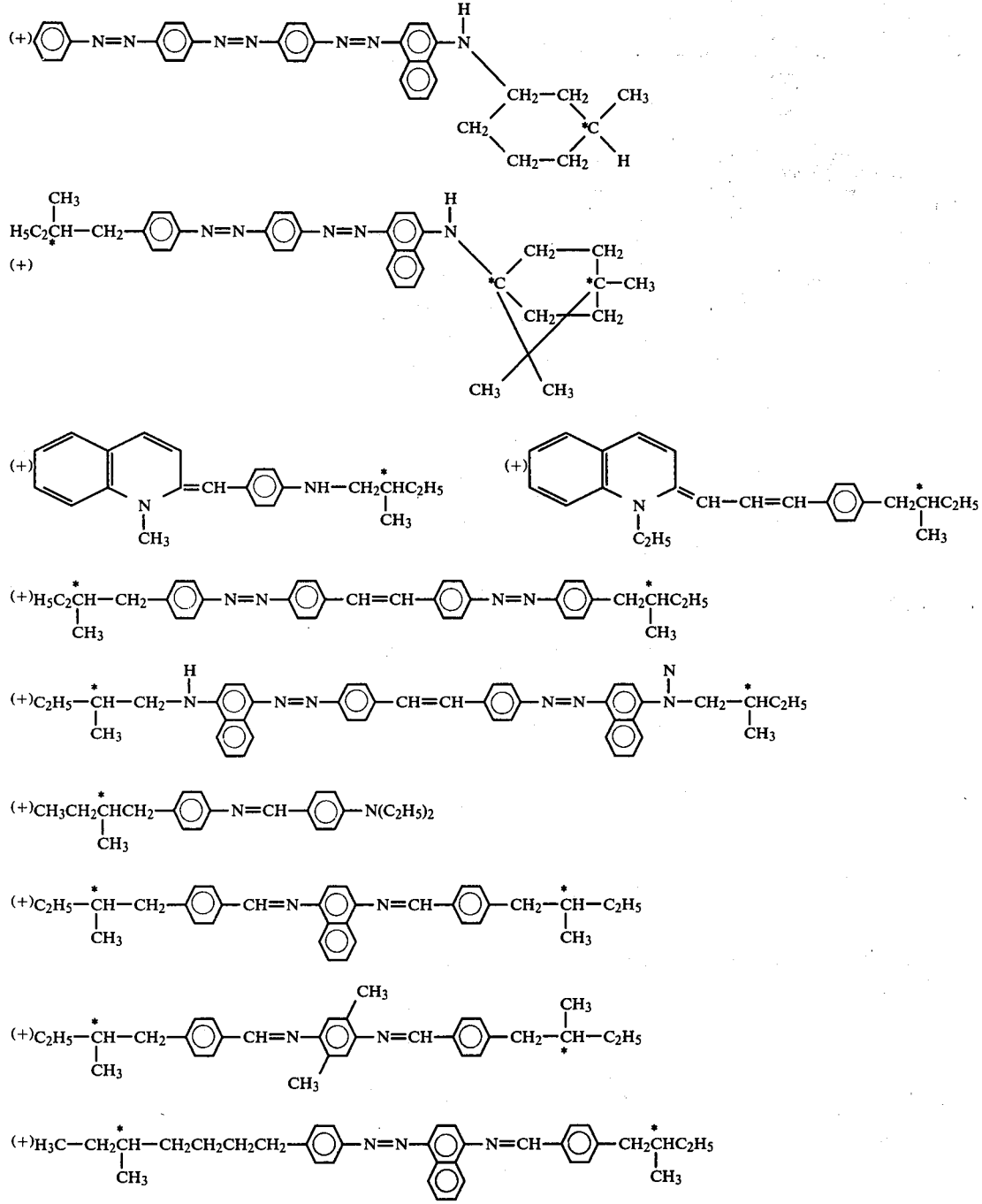

32. A composition consisting essentially of a nematic liquid crystal material and, in admixture therewith, an organic, nonionic, nonliquid-crystalline helichromic compound, said helichromic compound being soluble in said nematic liquid crystal material, and said helichromic compound being a dichroic dye and having the general formula Q(Z)$_n$
wherein:
Q is an anthraquinone radical;
n is 3; and
Z is an organic group capable of imparting helical ordering characteristics to said mixture of nematic liquid crystal material and helichromic compound, and Z is substituted in the 1, 4 and 5 positions of Q.

33. A composition consisting essentially of a nematic liquid crystal material and, in admixture therewith, an organic, nonionic, nonliquid-crystalline helichromic compound, said helichromic compound being soluble in said nematic liquid crystal material, and said helichromic compound being a dichroic dye and having the general formula Q(Z)$_n$
wherein:
Q is an anthraquinone radical;
n is 4; and
Z is an organic group capable of imparting helical ordering characteristics to said mixture of nematic liquid crystal material andhelichromic compound, and Z is substituted in the 1, 4, 5 and 8 positions of Q.

* * * * *